United States Patent

Stone et al.

[15] 3,680,124
[45] July 25, 1972

[54] SYSTEM FOR DETERMINING AZIMUTH

[72] Inventors: Albert M. Stone; Edwin E. Westerfield, both of Silver Spring, Md.

[73] Assignee: The United States of America as represented by the Secretary of the Navy

[22] Filed: May 11, 1964

[21] Appl. No.: 367,899

[52] U.S. Cl............................343/113 R, 343/100 ST, 343/117 A
[51] Int. Cl..............................................................G01s 3/48
[58] Field of Search..........................343/100 ST, 117 A, 113

[56] References Cited

UNITED STATES PATENTS 3,005,199  10/1961  Grandsard.......................343/113 X
3,140,490  7/1964  Sichak et al..................343/117 A UX

OTHER PUBLICATIONS

Thompson, W. J., IRE Transactions on Instrumentation, March, 1957, pp. 12–17.

*Primary Examiner*—Benjamin A. Borchelt
*Assistant Examiner*—Richard E. Berger
*Attorney*—J. P. Dunlaney and J. O. Tresansky

[57] ABSTRACT

The invention provides a system employing a radio interferometer, in conjunction with a satellite whose orbit is precisely known, for determining the azimuth of a receiving station receiving a signal from said satellite by computing the relative phase difference of the signal from said satellite as it appears at each of two spaced antennas at said receiving station.

20 Claims, 12 Drawing Figures

ALBERT M. STONE
EDWIN E. WESTERFIELD
INVENTORS

PHASE MEASURING
INTERFEROMETER SYSTEM

PHASE ANGLE VERSUS TIME,
INCLINATION AND BEARING

ALBERT M. STONE
EDWIN E. WESTERFIELD
INVENTORS

BY

*Claude Funkhouser*
ATTORNEY

ALBERT M. STONE
EDWIN E. WESTERFIELD
INVENTORS

ALBERT M. STONE
EDWIN E. WESTERFIELD
INVENTORS

Claude Funkhouser
ATTORNEY

PHASE FOLLOW-UP SERVO

SYSTEM FOR DETERMINING AZIMUTH

The present invention relates generally to position determining systems and more particularly to an improved system for determining azimuth.

In the last few years artificial satellites have been put to a great many uses, including such things as ionospheric studies, radiation measurements, heat studies, weather predictions, and defense activities such as reconnaissance and ICBM detection. An additional field, which is rapidly expanding, is the use of satellites for navigational and geodetic measurement purposes. To date, the majority of all the efforts in these latter two fields have been expended on position determination; that is, determining the position of the receiving station. It was natural, therefore, to seek a means for utilizing satellites for precision determination of azimuth.

For an azimuth determining system to be useful, in a practical situation, it must be capable of providing information to a much higher degree of accuracy than simpler devices such as a magnetic or gyroscopic compass. It can complete with such methods as optical sightings of the sun or the stars due to an all weather capability.

For reasons of convenience, such a system could be utilized in conjunction with one of the U.S. Navy's programs to provide a number of satellites in orbit at all times, wherein the orbits will be so arranged that every point on the earth will be covered by a satellite several times each day. These satellites emit signals on several frequencies from very stable sources which are ideal for use with the subject azimuth determining system.

To utilize a satellite for measuring azimuth, there are a number of requirements placed on both the satellite and the receiving equipment. The satellite must have a sufficiently stable and known orbit so that its location in "inertial space" is known at each instant of time it is above the horizon. For the purposes of this specification, "inertial space" will be defined as, "a system of coordinates that is fixed with respect to the stars and does not rotate with the earth but has the identical orbit as the earth around the sun." If the position of the satellite is known in "inertial space", its position with respect to any location on the surface of the earth can be determined mathematically. To utilize the satellite for azimuth determining purposes it is, therefore, necessary that the location of the receiving site be accurately known. This can be determined either by geodetic means or by utilizing the same satellite and any one of a number of systems currently available. These methods include the Transit Doppler Method, the Army's Secor Method, the Minitrack Method and several others. If the position of the satellite is known at a particular time and the position of the receiving station is known, it is obviously possible to calculate the azimuth bearing of the satellite in orbit from the receiving site. If a method is available for electrically measuring the angle between the line of sight to the satellite and a local reference, it is then possible to determine the azimuth of the reference line with respect to north. The degree of precision is dependent upon the accuracy of the overall system.

It is an object of this invention, therefore, to provide an improved means for determining azimuth.

Another object of this invention is to provide a means for the determination of azimuth through the use of satellite signals.

Still another object of the present invention is to provide, in conjunction with an orbiting satellite, means for determining the azimuth of a station receiving signals form said satellite through the use of a radio interferometer.

Yet another object of the instant invention is to provide, in conjunction with a satellite whose orbit is precisely known, means for determining the azimuth of a receiving station receiving signals from said satellite by computing the relative phase difference of the signal from said satellite as it appears at each of two remote antennas at said receiving station.

A further object of the instant invention is to provide, in conjunction with a satellite and receiving station receiving signals from said satellite via two remote antennas, radio interferometer means for determining the azimuth of said receiving station by directly measuring the difference in phase between signals arriving at the two antennas.

A still further object of view, present invention is to provide a means, in conjunction with a satellite and a receiving station, for automatically determining and recording the azimuth of the receiving station with a higher degree of accuracy than heretofore possible.

It is an even further object of the invention disclosed herein to provide a means for automatically determining and recording the azimuth of a moving receiving station including a means for locking onto a receiving signal.

The attendant advantages of this invention will be better appreciated and said invention will become clearly understood by reference to the following detailed description when considered in conjunction with the accompanying drawings illustrating one embodiment of the instant invention, wherein:

FIG. 7 is a functional block diagram of the subject phase measuring interferometer system

If this system of measuring azimuth is to be useful, it must be considerably more accurate than the simpler methods previously mentioned. The accuracy of the system, no matter how good the measurement of the angles, cannot exceed the accuracy with which the position of the satellite, at any instant, is known. It is, therefore, desirable to make an analysis of this portion of the overall problem. To simplify this analysis, the satellite will be assume to have a circular orbit. For the purposes of this specification the satellite will be assumed to be at an altitude of approximately 500 miles At this altitude, the satellite is beyond the point where atmospheric drag affects it significantly, yet sufficiently low that only a nominal output power is required of its beacon transmitters.

Figure 1:
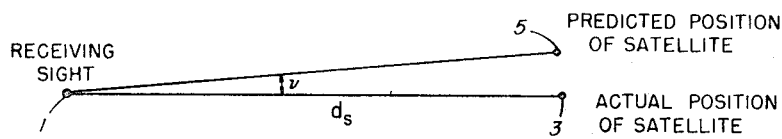
FIG. 1 is a plan view, showing a receiving site, the actual position of a satellite, and the position of a satellite as predicted in the equations of motion.
Figure 2:
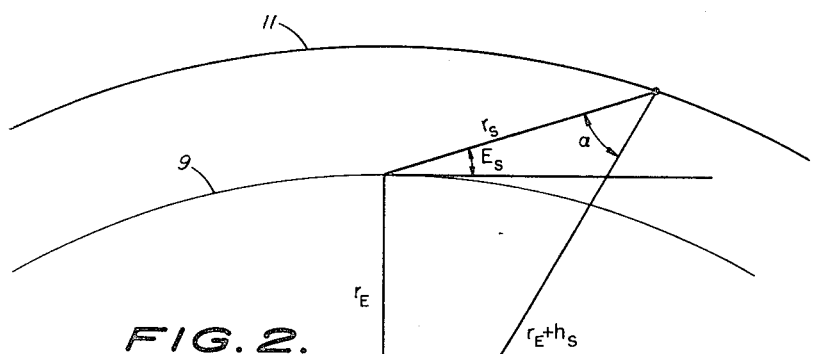
FIG. 2 is a geometrical representation of the relationships between a satellite, a receiving station, and the center of the earth, projected onto a plane passing through the satellite, the receiving station, and the center of the earth.

To obtain a figure for the accuracy to which the position of the satellite must be known, the worst case situation will be considered. Referring again to FIG. 1, a receiving site is shown at 1, the actual position of the satellite is shown at 3, and the position of the satellite as predicted in the equations of motion is shown at 5. A line of sight to the two positions 3 and 5 has been projected onto the horizontal plane tangent with the earth at the receiving site 1. The angle between these two projections is known as $\nu$. If we suppose that an accuracy requirement of 1 minute is to be met, then for a given projected distance to the satellite, the maximum error in miles can be readily determined as:

$$e = d \sin \nu \quad (A)$$

where $e$ is the maximum allowable error in the position of the satellite in miles for a given allowable azimuth error, and $d$ is the projected distance to the satellite. The determination of the distance $d$ can best be seen by referring again to FIG. 2. In this Figure the radius of the earth $r_E$, which for this purpose is considered to be 3,444 miles, is shown extending from the center of the earth 7 to the surface of the earth 9. The height of the satellite above the earth $h_s$, in miles, is shown extending radially from the surface of the earth 9 to the orbit of the satellite 11, and is assumed to be 500 miles. The slant range to the satellite is shown as $r_s$, and the elevation angle of the satellite above the horizontal plane is indicated by the angle $E_s$. The position of the angles $\alpha$ and $\gamma$ can be seen from the drawing. By applying the law of sines it can readily be seen that:

$$\alpha = \sin^{-1} \frac{r_E \sin (E_s + 90)}{r_E + h_s} \quad (B)$$

and that $\gamma$ is equal to:

$$\gamma = 180 - 90 - E_s - \alpha \quad (C)$$

By again applying the law of sines it can be seen that:

$$r_s = \frac{\sin \gamma \, (r_E + h_s)}{\sin (E_s + 90)} \quad (D)$$

By inserting equation (B) into equation (C) and equation (C) into equation (D), it is seen that:

$$r_s = \frac{r_E + h_s}{\sin (E_s + 90)} \sin \left[ 90 - E_s - \sin^{-1} \left( \frac{r_E \sin (E_s + 90)}{r_E + h_s} \right) \right] \quad (E)$$

$d_s$ is, therefore, equal to:

$$d_s = (r_E + h_s) \sin \left[ 90 - E_s - \sin^{-1} \left( \frac{r_E \sin (E_s + 90)}{r_E + h_s} \right) \right] \quad (F)$$

In the above equation certain terms have been cancelled. For a given allowable error, $\nu$, and a given elevation, the maximum allowable error of the position of the satellite is:

$$e = \sin \nu \left[ (r_E + h_s) \cos E_s + \sin^{-1} \left( \frac{r_E \cos 90}{r_E + h_s} \right) \right] \quad (G)$$

Typical values of $e$ for a desired accuracy of 1 minute are 0.55 miles if $E_s = 0$ and 0.13 mile if $E_s = 45°$. It must be remembered that the above is the worst case condition and expresses the error in the plane perpendicular to the line of sight between the satellite and the ground receiving site. From equation (G) it can be readily seen that the allowable error $e$ is a function of the elevation angle of the satellite. when the elevation is low, a much greater inaccuracy in the knowledge of position can be tolerated than when the elevation angle of the satellite is quite high, and in fact, when the satellite is directly overhead, essentially no error $e$ can be tolerated. In a practical case a great number of measurements are made during one pass of the satellite. A pass is defined for the purposes of this application as, "the period for each orbit during which the satellite is above the horizon." Since many measurements are made during each pass and these are averaged to obtain the final result, it is possible to weight the points in such a way that points where the elevation angle is very high will essentially be neglected in the calculations, thus, a realistic value of maximum allowable error in the knowledge of the location of the satellite, at each particular instant of time, may be established. Any error in the knowledge of the location of the ground receiving site will affect the final results in exactly the same manner as an error in the predicted location of the satellite. In fact, these two errors will add together. It can, therefore, be readily seen that it is very important that the location of the receiving station be known precisely and that the orbit of the satellite also be known precisely.

No attempt will be made herein to fully explain the techniques utilized to precisely determine the position of the satellite in space. Such position determining techniques are well-known in the prior art. However, it is felt that some degree of explanation is necessary.

The orbit of a satellite is described by means of 8 parameters. These parameters are the constants $X, \dot{X}, Y, \dot{Y}, Z$ and $\dot{Z}$ in geocentric coordinates, as well as the time of epoch and the Sidereal time of Greenwich at the time of epoch. The term epoch is being used herein to indicate the time for which the X, Y, and Z coordinates are true. To determine the manner in which the satellite will move from the time of epoch, it is necessary to know the potential field of the earth; that is, the manner in which gravity varies from one location to another. If this is known, it can be substituted in the equations of motion. These equations can then be used by means of a numerical integration to determine the position in space of the satellite at each instant. Other than the standard gravitational term, the following force functions are utilized. These are:

I. First oblateness term with respect to standard reference datum (axial quadrupole).
II. Third border zonal harmonic (pear shaped term).
III. Second oblateness term with respect to standard reference datum (the axial 16th pole term).
IV. The flattening of the ellipsoid.

The atmospheric drag term is also utilized within the equations. The valve of this term, of course, depends on the altitude of the satellite above the surface of the earth. The number of terms utilized, to obtain the maximum accuracy data described within this specification, is consistent with the present state of the art. When accurate values of additional terms are found, these terms may also be utilized.

The position in space of the receiving station can be determined quite simply since its location is known and the radius of the earth is precisely known. If the location of the station is known at each instant and the location of the satellite is known it is then possible to determine the bearing and elevation of the line to the satellite at each instant.

The present invention comprises a phase measuring interferometer system and before going into a thorough explanation thereof it is felt desirable to consider the operation of a basic interferometer system in detail.

Figure 3:
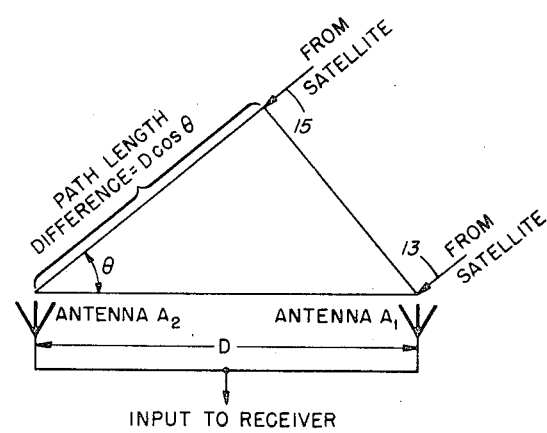
FIG. 3 is a representation of the antenna geometry of the receiving station.

Radio interferometers have been in use for a number of years for such things as missile guidance systems, radio telescopes, etc. As best seen in FIG. 3, the simple interferometer consists of two antennas $A_1$ and $A_2$ located a distance D apart (the distance D being equivalent to a number of wavelengths). A satellite (not shown) is at effectively an infinite distance from the two antennas $A_1$ and $A_2$, at least a distance very much larger than the separation between the two antennas. Under these conditions, the propagation paths of the signal from the satellite to each of the antennas $A_1$ and $A_2$ may be considered essentially parallel and are shown at 13 and 15, respectively. The path length difference between the two propagation paths 13 and 15 from the satellite to the antennas $A_1$ and $A_2$, respectively, can be seen (from the figure) to be equal to D Cosine $(\theta)$ where $\theta$ is the angle between a line connecting the two antennas $A_1$ and $A_2$ and the line of sight to the satellite. The signal at the antenna $A_1$ can be considered to be equal to:

$$V_{A_1} = V_r \sin 2\pi F_r t \quad (H)$$

where $V_r$ expresses the amplitude of the received signal and $F_r$ is the frequency of the received signal. $F_r$ is a function, not only of the frequency of the transmitted source, but also of the range rate between the antenna and the satellite. $V_{A_1}$ is the signal received by the antenna $A_1$. $V_{A_2}$, the signal received by the antenna $A_2$, is equal to:

$$V_{A_2} = V_r \sin 2\pi (F_r t + (D/\lambda) \cos \theta) \quad (I)$$

The right hand term $(D/\lambda)$ Cosine $\theta$ varies the phase of the signal received by the output as a function of the path length difference. The term $\lambda$, the wavelength of the received signal, is required to convert from distance to wavelength. With this system, the signal applied to the receiver is the sum of the signals received by the antennas $A_1$ and $A_2$. This is equal to:

$$V_D = 2V_r \sin \left( 2\pi F_r t + \frac{D}{\lambda} \cos \theta \right) \cos \left( \frac{\pi D}{\lambda} \cos \theta \right) \quad (J)$$

This equation has been simplified somewhat by standard algebraic manipulations. The term in the left hand set of brackets is that due to the received frequency shifted in phase by a function proportional to the path length difference. The term on the right causes the amplitude of the output to vary from a maximum of twice the output received from either antenna independently to zero forming a series of lobes. The spacing of the nulls; that is, when the signal amplitude equals zero, is a function of D/λ as well as of Cosine θ. The total number of nulls or lobes is equal to 2D/λ.

The output signal from the two antennas $A_1$ and $A_2$ is fed to a receiver where it can be amplified and detected. The output of the receiver is fed to a suitable analog recorder. Since the precise value of the signal strength is unknown, it is only possible to utilize this data to obtain an indication of the relative phase at either the peaks or the nulls. It can be readily seen that while the peaks will be quite wide, the nulls will be very sharp and can provide an accurate indication of when the phase difference φ equals 180°. If the recording is used to determine the time at which a null occurs, it is known that the angle θ, between the line of sight to the satellite and the line connecting the two antennas $A_1$ and $A_2$, is equal to one of a number of possible values at this particular instant. To determine which of the values is correct, it is necessary to have a rough estimate of the angle. This estimate can be obtained by knowing the approximate azimuth of the line, as determined by a nonprecision method such as a magnetic compass, and knowing the location of the satellite at the time of the null, as well as knowing the location of the receiving site.

The output from the detector of the receiver is equal to:

$$V_{DE} = \left[ \text{Cos} \left( \frac{\pi D}{\lambda} \text{Cos } \theta \right) \right]. \quad (K)$$

This term is essentially the right hand portion of equation (J), except that the detected output is equal to the absolute value of the equation. At the time of null, $V_{DE}$ is equal to zero, therefore, the term, $$I_t = (D/\lambda) \text{ Cos } \theta \quad (L)$$

must be equal to an odd integer, between 1 and N/2, where N is the total number of lobes for the antenna spacing and frequency. The best way to determine which of these integers to utilize is by substituting the estimated azimuth into equation (L) and rounding off $I_t$ to the nearest integer value. The precise angle θ may then be ascertained by inserting $I_t$ into the equation below:

$$\theta = \text{Cos}^{-1} (\lambda/\pi D) I_t \quad (M)$$

For each null, this procedure may be repeated so that up to 100 estimates of θ may be ascertained for one pass. In practice it is not necessary to utilize equation (L) for each point, since for each successive null it is only necessary to increase or decrease the integer appropriately by 2. If the equation (L) is utilized for two points, this establishes whether it is necessary to increment or decrement the integer for the other nulls.

To obtain the azimuth from the various values of θ, it is necessary to calculate the elevation and the azimuth of the satellite at each time that a null occurs. This can be accomplished by means of the numerical methods mentioned previously. Referring again to FIG. 4, a receiving station is shown at 17 comprising two antennas $A_1$ and $A_2$. A satellite is shown at 19, and the line of sight from the receiving station 17 to the satellite 19 is shown at 21. A directional line indicating north is shown at 23, and a line passing through the two antennas $A_1$ and $A_2$ is shown at 25. The angle θ (discussed hereinabove) is shown lying in the plane containing the two antennas $A_1$ and $A_2$ and the satellite 19. If a horizontal plane is drawn tangent to the earth at the point of the receiving station, two other angles can be constructed. These are the angle A, which is the angle between the projection of the line of sight 21 to the satellite 19 in the horizontal plane and a line through the two antennas $A_1$ and $A_2$, and the angle $E_s$, which is the elevation of the satellite above the horizontal plane, By the rules of three-dimensional trigonometry, $$\text{Cos } \theta = \text{Cos } A \text{ Cos } E_s. \quad (N)$$

Figure 4:
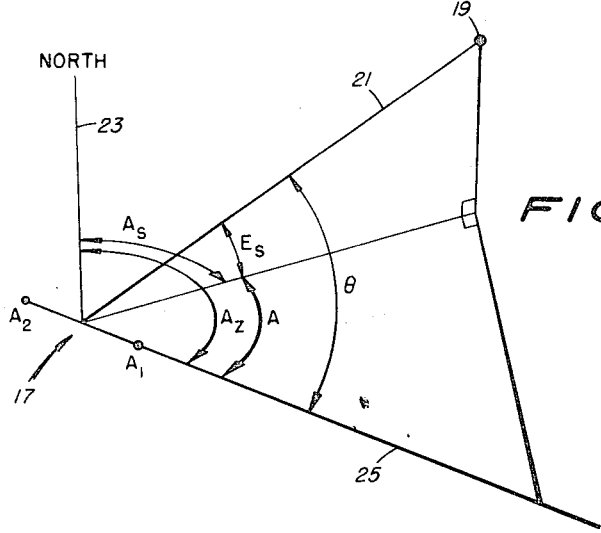
FIG. 4 is a three dimensional representation of basic interferometer geometry including representations of the geometrical relationships between a satellite, a receiving station, and the direction north.

FIG. 4 also shows the angle $A_s$, which is the azimuth of the satellite at a particular instant, and the angle $A_z$ which is the azimuth of the line connecting the two antennas $A_1$ and $A_2$. For convenience, the angle A is measured from the line connecting the two antennas $A_1$ and $A_2$ and is positive in the clockwise direction. With this in mind, the following holds true:

$$A = A_s - A_z. \quad (O)$$

By substituting equation (O) and equation (M) into equation (N), the following is obtained:

$$(\lambda/\pi) I_t = \text{Cos } (A_s - A_z) \text{ Cos } E_s. \quad (P)$$

By means of this equation, the integer $I_t$ can be obtained in the three-dimensional case. After the angles $E_s$ and $A_s$ are obtained from the calculations involving the satellite orbit, the angle $A_z$ can be estimated, and the other constants are all known. It may then be rounded to the closest integer. By rewriting this equation, $$A_z = A_s - \text{Cos}^{-1} \left( \frac{\lambda I_t}{D \text{ Cos } E_s} \right) \quad (Q)$$

possible to obtain the precise measurement of $A_z$. Again $A_s$ and $E_s$ are the angles, obtained from the calculations involving the orbit parameters of the satellite, and $I_t$ is the estimate obtained from equation (T). Equation (Q) may be solved for each null that occurs during the pass. By utilizing equation (Q) for each point, a number of different values for $A_z$ are obtained. These values may be averaged, though it is preferable to use a weighting routine, that will be discussed later, so that certain points are weighted more heavily than others. This system will function, but there are certain difficulties. Satellite passes have been taken by other people in the past, using this technique, and angles have been determined to within a few minutes. The difficulty with this system is that when a source such as a satellite is used, a very low signal level is received from the ground. As the nulls are approached, the signal becomes less than the noise level and if phase lock circuits are utilized within a receiver, lock is lost and difficulty is had in recapturing the signals. An additional problem is that it is impossible to determine exactly where the null is, since it is hidden in the noise. The difficulty of losing lock can be prevented by inserting an attenuator in one of the channels so that perfect cancellation does not occur. If the attenuator is utilized to prevent loss of lock it can be readily seen that it is very difficult to determine exactly where the null occurred. This difficulty is greatly increased by the normal signal variation that occurs from the satellite. This could very often cause a false indication of a null, or shift the actual null slightly from its true position. Another difficulty with this system is that is is very difficult to instrument it so that data can be taken automatically. To provide an automatic system, it would be necessary to store a large amount of data and then to determine exactly where the minimum signal strength had occurred. An additional problem is that the number of samples are limited by the antenna spacing, wavelength, and maximum elevation of the particular pass. The number of data points cannot be varied at the will of the operator. Such a system would also be somewhat difficult to calibrate.

Due to the problems mentioned hereinabove, a system has been designed that measures the phase difference between the two signals received by the two antennas directly. The antenna arrangement for this phase measuring system is identical with that for the basic form of interferometer system. If reference is again made to equations (H) and (I), it can be readily seen that the phase difference between the two signals is equal to:

$$\phi_r = (2\pi D/\lambda) \text{ Cos } \theta. \quad (R)$$

Where $\phi_r$ is the phase difference between the two signals, measured in radians, by substituting equation (O) into equation (N) and equation (N) into equation (R), it can be seen that, $$\phi_r = (2\pi D/\lambda) \cos (A_s - A_z) \cos E_s. \quad (S)$$

Since the distance between the two antennas D is much larger than λ, in our system, it can be readily seen that $\phi_r$ will rotate through many complete revolutions, i.e., for any principal value of $\phi$, there will be many possible azimuth angles. This situation is identical to the situation that there are many nulls that occur for any azimuth angle in a pure interferometer system. For convenience, equation (S) can be rewritten as follows:

$$2\pi_N + \phi_p = (2\pi D/\lambda) \cos E_s \cos (A_s - A_z). \quad (T)$$

Where $\phi_p$ is the principal angle and $_N$ is the integer number of the wavelength difference in the path length, in any system it is only possible to measure directly the angle $\phi_p$, the value of $_N$ must be determined by other means. This procedure will be covered more fully hereinafter, though it is essentially equivalent to the method mentioned previously for obtaining $I_t$.

Figure 5:
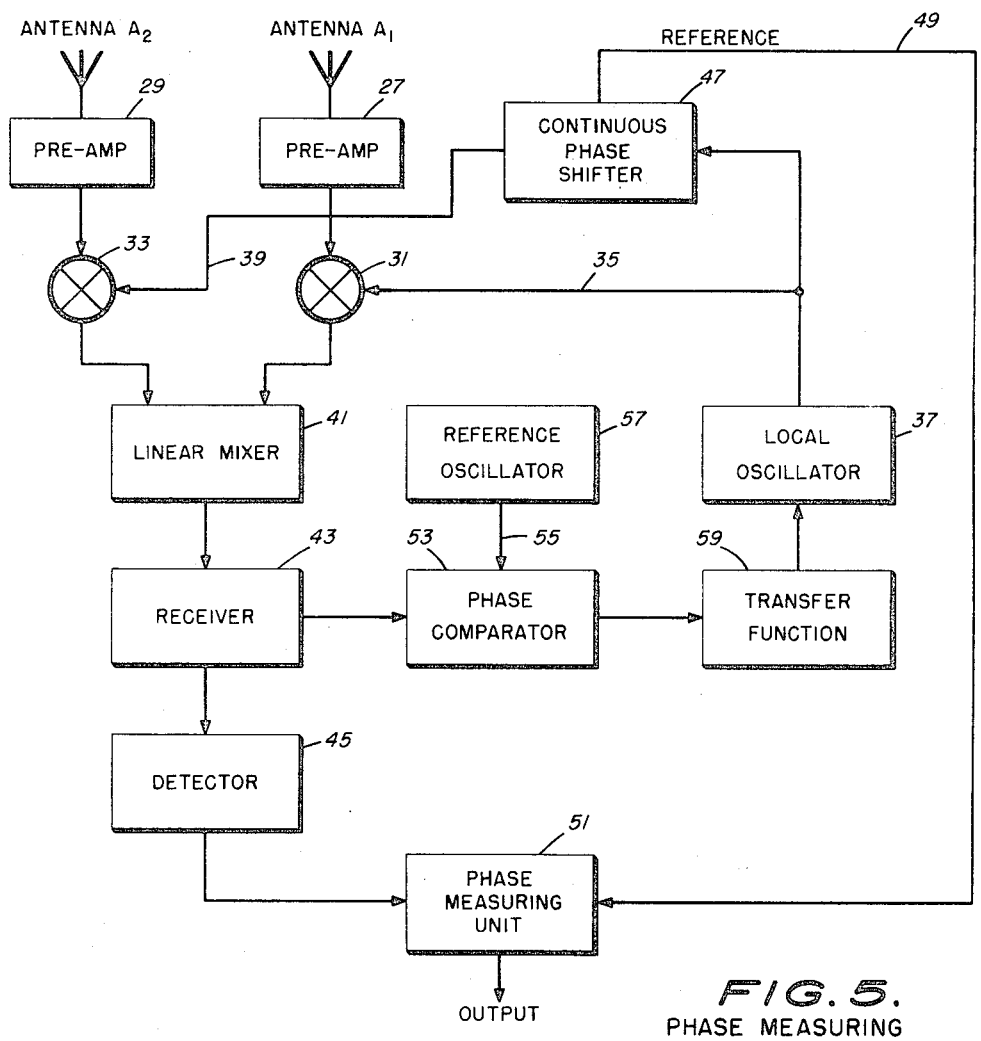
FIG. 5 is a functional block diagram of the basic phase measuring interferometer system.

Referring to FIG. 5, a block diagram of a general type of direct phase measuring interferometer is shown. A pair of spaced antennas $A_1$ and $A_2$ are shown connected to the preamplifiers 27 and 29, respectively. The preamplifiers 27 and 29 serve to provide a low noise level for the complete receiver. The preamplifiers 27 and 29 feed output signals to the mixers 31 and 33, respectively. The second input signal to the mixer 31, for the antenna $A_1$, is the local oscillator signal 35 which is fed directly from the local oscillator 37 to the mixer 31. The second signal 39 fed to the mixer 33 is the local oscillator signal, but changed in frequency by an amount equal to the scan frequency. The scan frequency is normally between 50 cycles and 1,000 cycles. As a result, for an input signal of a given RF frequency, the output of the two mixers 31 and 33 differs in frequency by an amount equal to scan frequency.

There are many ways for producing these two local oscillator signals 35 and 39 so that they are separated in frequency by the desired amount. The method selected will be described in detail hereinafter. The output signals of the two mixers 31 and 33 are summed in a linear mixer 41. These two signals are then fed through the first IF strips (not shown) of the receiver 43. The two RF signals are present within the band pass of the IF strips, separated by an amount equal to the scan frequency. The phase difference between these two signals at any instant is not only a function of the scan frequency but of the difference in phase between the two signals received by the two antennas $A_1$ and $A_2$. The output signal of the receiver 43 is fed to a detector 45, which said detector 45 produces a frequency equal to the frequency difference between the two signals.

The frequency difference between the two local oscillator signals 35 and 39 is produced by the continuous phase shifter 47. The phase shifter 47 also produces a scan reference signal 49 having a known phase relationship to the instantaneous difference in the phase of the two local oscillator signals 35 and 39. The scan reference signal 49 is then fed to an electrical phase measuring unit 51, where it is utilized as a reference signal. The signal from the detector 45 is also fed into this phase measuring unit 51. The output of the phase measuring unit 51 is then a direct indicator of the phase difference of the signal received at the two antennas $A_1$ and $A_2$. By calibrating this signal, with respect to the phase difference at the two antennas $A_1$ and $A_2$, it is readily possible to obtain an accurate measurement of the phase difference between the two antennas, and therefore, to obtain the required data for interferometric calculations.

In the operation of the system, the output from the IF strips in the receiver 43 is fed into a phase comparator 53 where the phase of the signal is compared to that of a reference signal 55, from a reference oscillator 57, the the same frequency as the last IF strip in the receiver 43. An error signal is generated that is filtered by an appropriate transfer function 59 and fed to the local oscillator 37 to change its frequency in order to keep the signal received by the antennas $A_1$ and $A_2$ in the center of the band pass of the IF strips in the receiver 43.

The phase measuring interferometer method has two advantages. The phase difference of the signal received by the two antennas $A_1$ and $A_2$ can be measured accurately, at any instant, and any number of data points can be taken without regard to the rate of actual phase change that occurs. To understand more fully the advantages of this system, it is desirable to investigate the various manners in which the phase may vary for various types of satellite passes.

Figure 6:
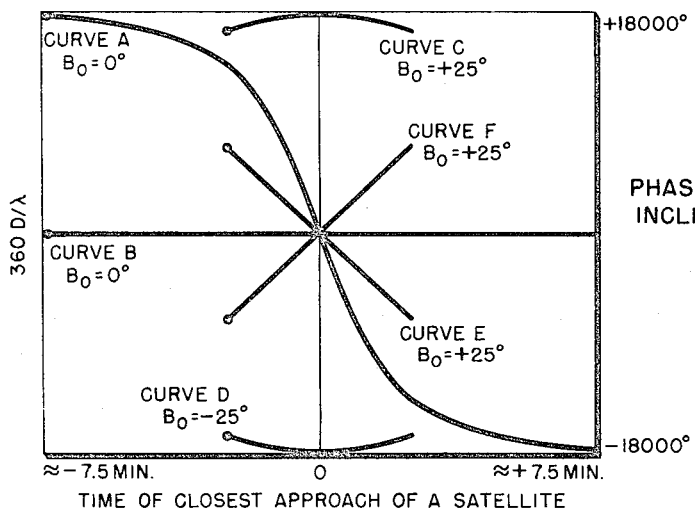
FIG. 6 is a graphical representation of phase angle versus time, inclination, and bearing.
Figure 2:
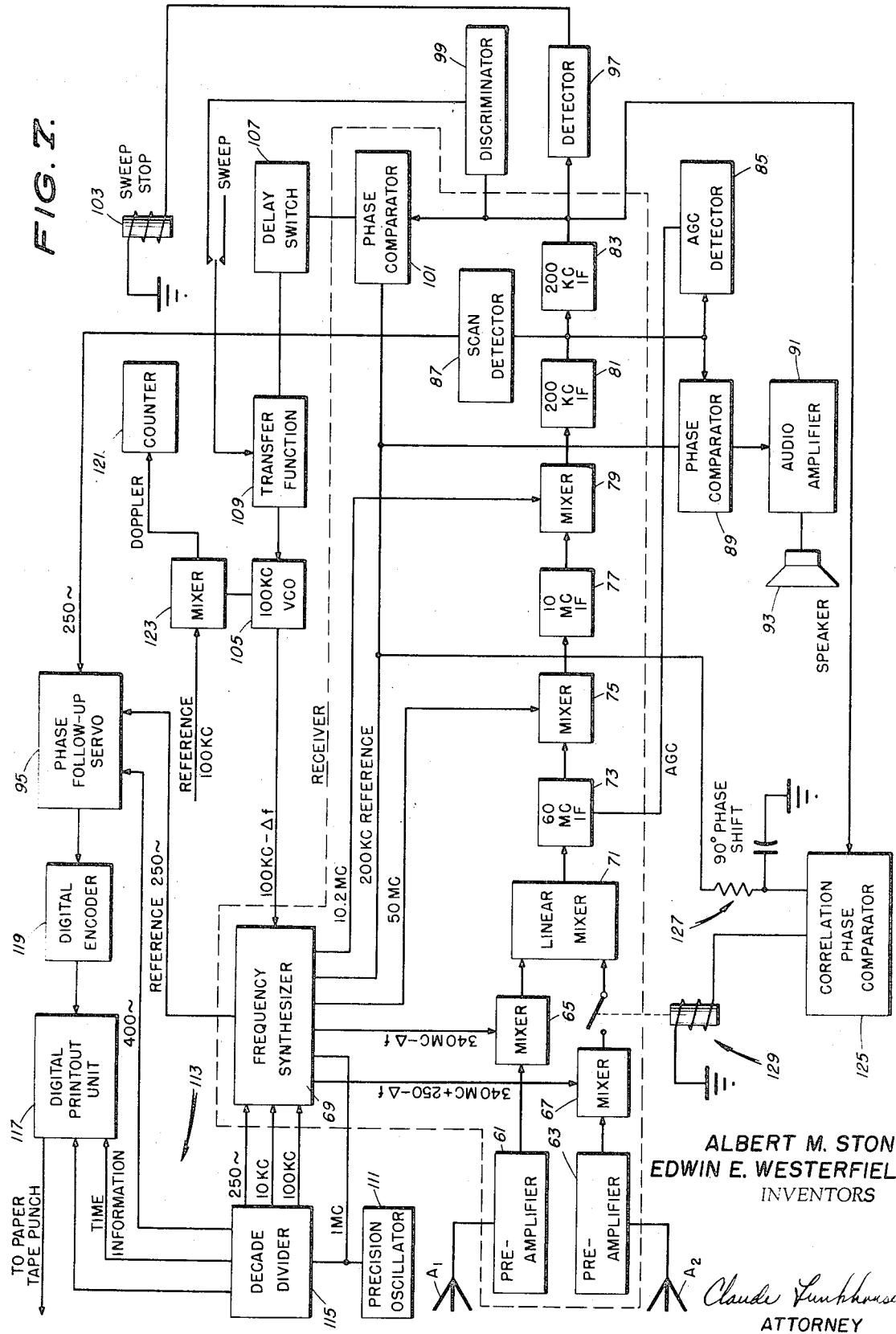

Referring to FIG. 6, the curves for the several types several types of satellite passes are shown. All the curves are plotted, assuming a circular orbit for the satellite around a non-rotating spherical earth. The curve A is for the condition where the satellite passes directly overhead and the antennas $A_1$ and $A_2$ are located in the plane of the orbit. In this case, maximum phase shift will occur. In the case of $\lambda = 2$ feet and $D = 100$ feet (the distance between the antennas $A_1$ and $A_2$), the total phase will vary from −50 to =50 complete rotations, or to approximately 18,000 ° in each direction. Curve B is for the condition where the satellite passes directly overhead and the line joining the antennas is perpendicular to the orbital plane. There is no phase shift during the complete pass under these conditions. The remaining curves are for the conditions where the satellite does not pass directly over the receiver. For these the inclination of the orbit $B_o$ with respect to the receiving station is +25°. For circular orbits the inclination is here defined to be the angle subtended at the center of the earth by the tracking station and the nearest point of approach of the satellite. Curve C is for the condition where the line connecting the two antennas is perpendicular to the line generated by the plane of the orbit and the earth's surface. It can be seen also that the period over which the phase information is obtained is less since the satellite is above the horizon for a shorter period of time. Curve D is essentially the same as curve C except for a minus 25° angle of inclination with respect to the receiving station. Curves E and F are for the case where the line connecting the two antennas is parallel to the plane of the orbit.

If a satellite pass is of the B type, it can be seen that if the pure interferometer system was utilized, probably no nulls would be obtained, and if so they would be so broad as to be useless. With the phase measuring system, however, accurate phase measurements can still be made even though the phase is constant throughout the pass. The phase measuring system would have been able to produce any number of data points desired. Additionally, with this system there are never any nulls so that the full signal strength can be utilized at all times.

To determine the azimuth angle $A_2$, the equation (T) can be rewritten as follows:

$$A_z = A_s - \cos^{-1} \frac{(2\pi_N + \phi_p) \lambda}{2\pi D \cos E_s} \quad (U)$$

If the orbit parameters of the satellite are known, the terms $A_s$ and $E_s$ are known at any particular instant. The antenna separation D, is also known, as well as λ. The angle $\phi_p$, that is, the principal angle, can be measured as shown previously. The equation cannot be solved for $A_z$, however, since the value of the integer $_N$ is not known. There are a number of different ways in which $_N$ can be determined. It must be remember that $_N$ is an integer number, which varies in steps during the satellite pass and that it also is a function of the antenna azimuth. For purposes of calculation, the following equation can be established:

$$N = _N + \epsilon. \quad (V)$$

Where $_N$ is the integer number indicating complete phase rotations, as measured by the receiver, and $\epsilon$ is the difference between $_N$ and N, $\epsilon$ is a constant for any one pass and may be either negative or positive. N is only a reference number, utilized to keep track of $_N$ by the receiver since there is Ndirect way to measure $_n$, but the step changes in N can easily be determined.

If the value of $\epsilon$ can be determined for any particular pass and N can be kept track of, either automatically or manually, then the value of $_N$ can be determined for each data point.

While there are several ways in which $\epsilon$ can be determined, the easiest method seems to be through the use of trail data points, as mentioned previously.

A number of trail data points are selected that are spread over the period of the pass. One method which may be selected for determining these trail points consists basically of dividing the period of the satellite pass into 11 areas. The data points nearest the junction of these areas are then utilized for the trail points. For each of these points, the location of the satellite is determined at the particular instant and $E_s$ and $A_s$ are calculated. The value of $\phi$ for the particular data point using an estimated value of $A_z$, correct to within plus or minus 2°, must also be calculated. This is known as $\phi_c$. To determine $\phi$, the following equation should be used:

$$[(\phi_m + 2\pi\epsilon) - \phi_c] < \pi \qquad (W)$$

where $\epsilon$ is varied in integer steps to cause the left side of the equation to be less than $\pi$. Use of the above equation is based on the assumption that $A_z$ can be determined with sufficient accuracy by other methods, such as a standard compass, that an estimate of $\epsilon$ can be made. This estimated value of $A_z$ is known as $A_{Z4}$. This procedure is repeated for all of the trail data points. The results for all the points are then examined and the selection of $\epsilon$ made on the basis of a certain minimum number of the trail points yielding the same value of $\epsilon$. The present criteria is that at least 7 of the 10 points must yield the same value.

The valve of $\epsilon$, obtained above, can now be utilized to obtain $_N$ to be used in solving the equations for $A_z$ for each of the many data points taken during the satellite tests.

Referring to FIG. 7, a functional block diagram of the receiver proper and also various external blocks such as portions of the digital read-out system are illustrated. At the lower left hand corner of the diagram are shown the two antennas $A_1$ and $A_2$ followed by the two preamplifiers 61 and 63, respectively, which under suitable conditions, are mounted directly at the antennas $A_1$ and $A_2$. The preamplifiers 61 and 63 are of a standard commercial type, such as constructed by the Community Engineering Co. These units have a noise figure of approximately 6 db at the region of interest. The output signals of the preamplifiers 61 and 63 are fed into RF amplifier and mixer assemblies 65 and 67, respectively. The two local oscillator signals (see discussion of the general phase measuring interferometer system in connection with FIG. 5) are derived from the frequency synthesizer 69 which will be described in detail infra. The signal from the frequency synthesizer 69 to the mixer 65 is at a frequency of 60 megacycles below the frequency of the satellite minus the Doppler shift. The frequency transmitted by the satellite will be assumed to be 400 megacycles and the Doppler term will be called $\Delta f$. Therefore, it is readily seen that the signal from the frequency synthesizer 69 to the mixer 65 will be at a frequency of 340 megacycles minus $\Delta f$. The other local oscillator signal is at a frequency of 60 megacycles below the frequency of the satellite, plus 250 cycles minus the Doppler term. It can be readily seen that the signal from the frequency synthesizer 69 to the mixer 67 will be at a frequency of 340 megacycles plus 250 cycles minus $\Delta f$. The output signals from the mixer 65 and the mixer 67 are fed into a linear mixer 71 which sums the signals. This mixer feeds a 60 megacycle IF strip 73 of a commercial type. The IF strip 73 has a bandwidth of 10 megacycles with a gain of approximately 90 db. Ideally, the IF strip 73 would have a frequency somewhat lower, however, but its present frequency was selected due to the availability of certain assemblies. The output signal of the IF strip 73 is fed into a mixer 75 where it is mixed with a 50 megacycle signal from the frequency synthesizer 69 to generate a 10 megacycle signal. This 10 megacycle signal is fed to the 10 megacycle IF strip 77 which has very little gain and incorporates a 1 kc wide crystal filter (not shown). The output signal of the IF strip 77 is fed through another mixer 79 where it is mixed with a 10.2 megacycle signal, also from the frequency synthesizer 69. The result is a 200 kc signal. This 200 kc signal is fed into a 200 kc IF strip 81 which incorporates a crystal filter having an 800 cycle band width (not shown). The main function of the 10 megacycle IF strip 77 is to serve as a filter in order to prevent the 200 kc IF strip 81 from seeing an image within the bandwidth of the 60 megacycle IF strip 73. The output signal of the IF strip 81 feeds four different units; a 200 kc IF strip 81 feeds four different units; a 200 kc IF strip 83 having a 100 cycle bandwidth, an AGC detector 85, a scan detector 87, and a wideband phase comparator 89. The AGC detector 85 develops the required AGC voltage which is fed back to the 60 megacycle IF strip 73. This loop is adjusted to keep the output of the first 200 kc IF strip 81 as nearly constant as possible. The phase comparator 89 feeds a signal to the audio amplifier 91 and thence to the speaker 93 to provide an audio beat note that greatly aids in acquiring lock and locating spurious signals. The scan detector 87 is used to beat the two signals that exist within the IF strip 81 together, to produce an output of the scan frequency whose phase, with respect to the reference phase, is indicative of the phase difference of the RF signal received by the two antennas $A_1$ and $A_2$. This signal is fed to a phase follow-up servo 95 that will be described hereinafter. The second 200 kc IF strip 83 filters the signal in such a way that only the signals from one of the antennas $A_1$ and $A_2$ is present at its output. The output of this IF strip is fed into a detector 97, a discriminator 99, and a phase comparator 101 simultaneously.

The purposes of the detector 97, the discriminator 99, and the phase comparator 101, mentioned hereinabove, are evident by the following operating sequence of the receiver.

Before acquisition of a signal, the receiver is automatically swept over a frequency region surrounding the expected location of the signal. The region can be readily adjusted in size in a manner well-known to the art. The output signal of the first IF strip 73 is kept at an essentially constant level by the signal from the AGC detector 85. The AGC detector 85 sees the complete 800 cycle bandwidth from the IF strip 81. The portion of the noise seen by the second 200 kc 100 cycle bandwidth IF strip 83 is reduced to 1/8 of the total because of the decrease in bandwidth. The noise develops a certain output from the detector 97. When the receiver sweeps past the signal, the output from the 100 cycle bandwidth IF strip 83 will increase, because more of the energy within the 800 cycle bandwidth of the preceding IF strip 81 will be concentrated at one spot. The increase in level causes an increase in the output of the detector 97 which operates the sweep stop circuitry 103 which switches the input into the voltage controlled oscillator 105 from the sweep circuitry to the discriminator 99. The discriminator 99, which includes a crystal filter (not shown) and is very stable to the center frequency, pulls the receiver closer to the signal in a normal AFC fashion. At this point the phase comparator 101 is switched into the circuit automatically by means of the delay switch 107, and fed through the transfer function 109 to the voltage controlled oscillator 105, pulling the signal to the direct center of the 100 cycle bandwidth IF strip 83 and allowing a phase lock to be accomplished. The transfer function 109 is required to provide adequate tracking of the signal under various conditions and to minimize the tracking error. The loop is very similar to that utilized in tracking filters built by the Interstate Engineering Co. The exact frequency of the signal received can be readily determined by measuring the frequency of the voltage controlled oscillator 105 (which is a nominally 100 kc voltage controlled oscillator). The amount that the frequency of the voltage controlled oscillator 105 is below 100 kc indicates the amount that the received signal is below 400 megacycles.

The signal from the voltage controlled oscillator 105 is fed into the frequency synthesizer 69 where it offsets the local oscillator signals by the appropriate amount. The frequency synthesizer 69 receives a precision 1 megacycle signal from the precision oscillator 111. This signal is multiplied up in frequency and utilized to provide all the other frequencies required.

The signal from the precision oscillator 111 is also utilized by the digital time unit shown generally at 113. The signal is fed into the decade divider 115 which comprises a series of 11 decade divider units, with the divider stages of a seconds counter to be described infra, (not shown) and reduces the output from the 1 megacycle precision oscillator 111 to 1 pulse per day through the use of appropriate feedback around the final stages. The decade divider 115 provides a number of different pulse rates to the frequency synthesizer 69 for the generation of the various signals to be utilized for the various references. The output signals from the decade divider 115 of 1 pulse per second and lower are utilized for generation of time information only. The 11 decade divider units of the decade divider 115 are preset in such a way that they will indicate directly the time and seconds as referenced to Greenwich time (in a well-known manner). The digital time unit 13 includes a digital print-out section 117. The digital print-out unit 117 utilizes the time information from the decade divider unit 115 and information from the digital shaft encoder 119. The operation of the digital shaft encoder 119 will be covered in detail hereinafter. The information from the digital shaft encoder 119 is in a special code format known as Datex Code. This Datex Code is a nonambiguous BCD type of code. The digital print-out unit 117 converts both the information from the digital shaft encoder 119 and from the decade divider 115 into teletype code and operates a paper tape punch (not shown) to punch out the data in the required format. This format consists of listing the five decade characteristics from the digital shaft encoder 119 and then listing the five decade characteristics from the time unit 113. A carriage return and line feed is then punched and the operation repeated for the next data points.

The output of the scan detector 87 which is connected to the output of the 800 cycle bandwidth IF strip 81, is fed to the phase follow-up servo assembly 95.

The phase follow-up servo assembly 95 is a device that converts the phase difference between the signal input and the 250 cycle reference input from the frequency synthesizer 69 into a mechanical shaft angle. By connecting suitable read-out devices to this shaft (in a well-known manner) the angular difference between the reference signal and the input signal can be determined either utilizing digital or analog techniques. An advantage of this type of phase measuring device is that as the angle rotates through many rotations, it is easily possible to keep track of the total angular change between the two signals. This is possible since the shaft can be geared down to run an auxiliary encoder or auxiliary analog device to keep track of $_N$. With a pure electronic system, this would be considerably more difficult, though certainly feasible.

The counter shown at 121 is utilized to ascertain the precise Doppler frequency that the receiver is adjusted to. This is of great help in initially acquiring the satellite within the narrow receiver bandwidths. The mixer 123 is utilized to convert the actual voltage controlled oscillator 105 frequency to a frequency proportional to the number of cycles below the integral number of megacycles to which the receiver is tuned. A correlation phase comparator is shown at 125 and comprises a phase comparator whose reference is 90° out of phase with that of the phase comparator 89 utilized for tracking. This 90° phase shift is produced in a well-known manner, as by the resistive capacitive network 127. As a result, when the system is locked onto a signal a dc level will be available from the correlation phase comparator 125. This signal is utilized to operate the relay switch 129 and switch in the second signal. This switching arrangement is necessary to control which of the two signals the receiver initially locks on. If the receiver is not being utilized to provide Doppler information by means of the counter 121, it would not be of consequence which signal the receiver locked onto, but in many cases, the Doppler information will be utilized and it is therefore necessary to have the channel that does not have the 250 cycle offset provide the portion of the spectrum that is seen by the tracking phase comparators 89 and 101. The second signal will not interfere with the tracking process when it is switched in, since the phase comparator 101 receives its signal from the 100 cycle bandwidth IF strip 83. If any signal is present out of this IF strip 83, it still will not disturb the phase comparator 101, since the frequency different is so high as to prevent loss of phase lock.

Figure 8:
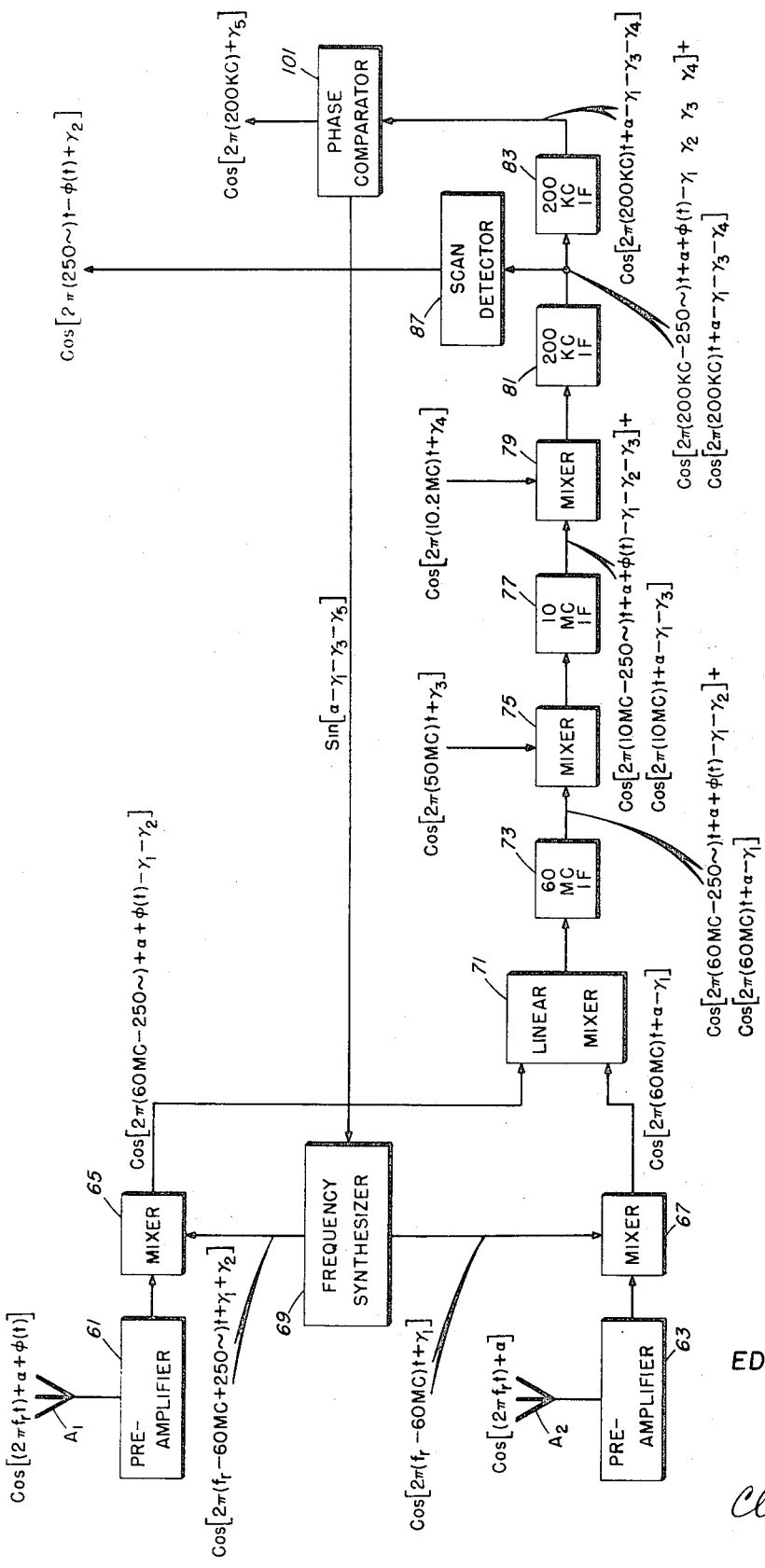
FIG. 8 is a functional block diagram illustrating the various phase relationships existing in the receiver of FIG. 7.

Referring to FIG. 8, the receiver portion of the phase measuring interferometer system of FIG. 7 is presented in block diagram form to clarify the various phase relation ships that exist therewithin. The Figure assumes that the receiver is already phase locked and is properly tracking. The frequency listed as $f_r$ is the frequency being received at the antennas $A_1$ and $A_2$ from the satellite. The phase term $\alpha$ is a random phase vector due to such things as the distance from the receiver to the satellite and the point at which t is considered to be equal to 0. The term $\phi(t)$ is the same $\phi$ previously used in this specification. It is shown as a function of $t$, since the term will vary during the satellite pass. The term $\phi(t)$ only appears in the signal shown for one antenna since the other antenna is assumed to be a reference antenna. The first local oscillator signal obtained from the frequency synthesizer 69 contains the term $f_r - 60$ megacycles. This frequency is controlled by the phase lock loop so that the signal is precisely 60 megacycles from the incoming signal. The term $\gamma_1$, however, may exist due to an error in phase tracking. The signal to the second mixer 75 is identical to that just described except that it is offset by 250 cycles by a method to be covered hereinafter. In offsetting this signal, the phase term $\gamma_2$ is included to cover the random phase uncertainty.

To simplify the drawing, only the terms out of the various mixers that are actually utilized are noted. There will be other terms of different frequencies, but these will be removed by various filters or IF strips. At the output of the mixers 65 and 67 the two signals are summed in the linear mixer 71. The mixer 75 converts the signals from 60 megacycles to 10 megacycles. In the conversion process, the phase term $\gamma_3$ is added to account for the phase uncertainty of the local oscillator signal at 50 megacycles. The signals existing at the output of the 10 megacycle IF strip 77 are identical with that of the 60 megacycle IF strip 73 except for the change in the base frequency and the addition of the $\gamma_3$ term. The third mixer 79 converts the signals to 200 kc and adds an additional uncertainty term $\gamma_4$. The signal is then fed into the detector 87 and may be filtered to remove all components above the 250 cycle difference component. The output signal is seen to be equal to:

$$V_1 = \cos[2\pi \cdot 250t - \phi(t) - \gamma_2] \qquad (X)$$

Thus, all uncertainty terms except $\gamma_2$ are removed, leaving only the 250 cycle signal, $\gamma_2$, and the $\phi(t)$ term. By applying the signal to a phase measuring device, to be described hereinafter, the value of the phase term, that is, $\phi(t)$ and $\gamma_2$ can be measured. The term $\gamma_2$ is a constant for the system and its value can be determined by a calibration process and effectively removed from the calculations.

The output of the 200 kc 800 cycle bandwidth IF strip 81 is also fed to a 200 kc 100 cycle bandwidth IF strip 83. This IF strip removes the offset signal leaving only the signal whose frequency is:

$$V_2 = \cos[2\pi(200 \text{ kc})t + \alpha - \gamma_1 - \gamma_3 - \gamma_4] \qquad (Y)$$

This signal is applied to the phase comparator 101 where it is compared to a signal obtained from the reference. To cover phase uncertainty due to the 200 kc reference signal, the term $\gamma_5$ is added. The signal from the phase comparator 101 may be filtered to remove all but the very low frequency components. The resultant signal is proportional to the sine of the phase difference between these two signals. This signal is:

$$V_3 = \sin[\alpha - \gamma_1 - \gamma_3 - \gamma_4 - \gamma_5] \qquad (Z)$$

If the phase loop is operating properly, the term $V_3$ will be driven to essentially zero by the loop. It thus can be seen that the stray phase terms do not affect the operation of this system. To simplify the above explanation, the amplitude terms of all expressions have been neglected.

Figure 9:
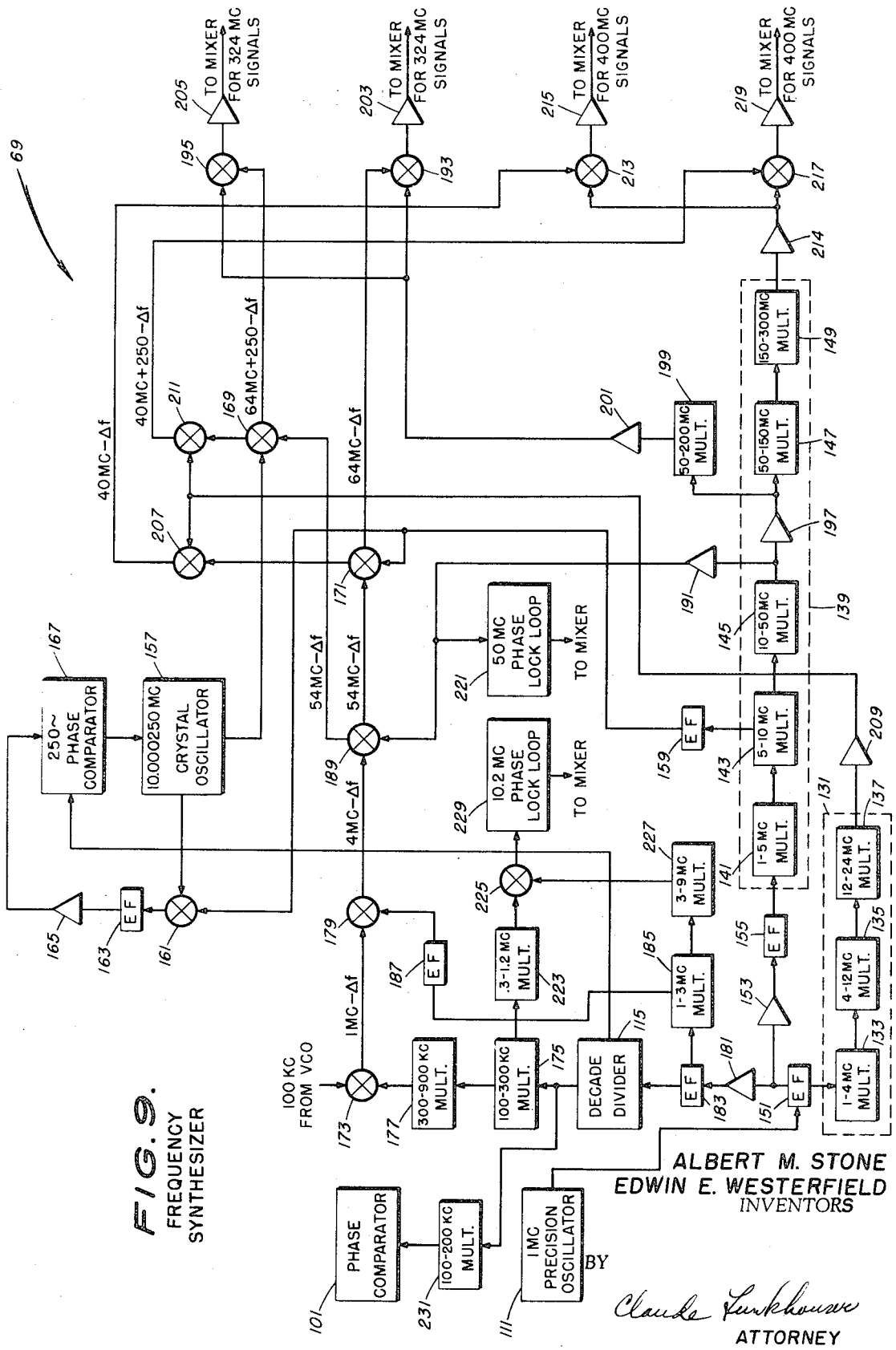
FIG. 9 is a functional block diagram of the frequency synthesizer of FIG. 7.

Referring to FIG. 9, the frequency synthesizer 69 (of FIG. 7) is shown in block diagram form. As mentioned previously hereinabove the frequency synthesizer 69 generates the two local oscillator signals for the first mixers 65 and 67 that differ in frequency by 250 cycles and that track the incoming signal, both in frequency and in phase. The frequency synthesizer 69 also provides all the other required local oscillator signals. The operation of the frequency synthesizer 69 requires a 1 megacycle signal from the precision oscillator 111 (in FIGS. 7 and 9). The Hewlett Packard model 103 AR quartz oscillator is suitable for this purpose. This unit has a stability of 5 parts in $10^{10}$ per day. A second frequency required for the operation of the frequency synthesizer 69 is that obtained from the 100 kc voltage controlled oscillator 105 (FIG. 7). The voltage controlled oscillator 105 is varied in frequency and causes the first local oscillator signal to vary by a like number of cycles.

The one megacycle signal from the precision oscillator 111 is fed to a series of multipliers. One chain of these multipliers 131 multiplies the 1 megacycle signal directly up to 24 megacycles, and comprises the multipliers 133, 135 and 137. Another chain of multipliers 139, comprising the multipliers 141, 143, 145, 147 and 149, multiplies the 1 megacycle signal (from the 1 megacycle precision oscillator 111) up to 300 megacycles. Signals are utilized from the various stages of the multiplier chain 139 to provide many other frequencies.

The provision of the 250 cycle offset of the local oscillator signals to the two mixers 65 and 67 (FIG. 7) will now be discussed in detail. The 1 megacycle precision oscillator 111 provides a 1 megacycle signal to the multiplier chain 139 through the emitter follower 151, the 1 megacycle amplifier 153 and the emitter follower 155. The output signal from the emitter follower 155 is multiplied up to 5 megacycles by the multiplier 141 and is sent to the multiplier 143 where it is multiplied up to 10 megacycles. Within the frequency synthesizer 69 is located a 10.000250 megacycle crystal oscillator 157. Across the crystal within the oscillator circuit is placed a Varicap (not shown) to enable the frequency of the oscillator to be varied over a limited range. A Varicap is a silicon diode that is back biased. The capacity that it presents varies as a function of the bias voltage. By use of this Varicap the frequency of the crystal oscillator 157 can be varied from approximately 10.000100 megacycles to 10.000400 megacycles. The 10 megacycle output signal from the multiplier 143 is passed through an emitter follower 159 to a 250 cycle mixer 161 where it is mixed with the output signal from the crystal oscillator 157. The output of the mixer 161 is the difference between the two signals, normally 250 cycles. This 250 cycle signal output from the mixer 161 is passed through an emitter follower 163, and a 200 cycle amplifier 165, to a phase comparator 167. The phase comparator 167 also receives a 250 cycle signal from the decade divider 115 (FIG. 7), and compares the phase of the 250 cycle signal from the decade divider 115 with the phase of the 250 cycle signal from the amplifier 165. Any error in phase, between these two signals, generates an error signal which is applied to the Varicap across the crystal in the crystal oscillator 157. This changes the frequency of the oscillator 157 in such a manner that the two signals are locked together with a 250 cycle difference in frequency. The 10.000250 megacycle signal from the crystal oscillator 157 is fed to a 64 megacycle mixer unit 169. The emitter follower 159 passes a 10 megacycle signal to another 64 megacycle mixer 171 from the multiplier chain 139. For simplicity, only the circuit utilizing the 10 megacycle signal will be described, since the other channel is virtually identical.

The nominal 100 kc voltage controlled oscillator 105 (FIG. 7) supplies a signal to a 1 megacycle mixer 173 (FIG. 9). The mixer 173 also receives a 900 kc input signal that is obtained by multiplying the 100 kc reference signal from the decade divider 115 (FIG. 7) in the multipliers 175 and 177. This reference 100 kc signal is obtained from the decade divider 115 and is derived from the precision 1 megacycle oscillator 111 (FIG. 9). The output signal of the mixer 173 is a 1 megacycle signal minus the offset of the voltage controlled oscillator 105 (FIG. 7) from 100 kc which is henceforth known as $\Delta f$. This signal is fed into the mixer 179 where it is mixed with a 3 megacycle signal, obtained by passing the signal from the emitter follower 151 through a 1 megacycle amplifier 181, an emitter follower 183, a multiplier 185, and an emitter follower 187. The output signal of the mixer 179 is 4 megacycles $- \Delta f$. The signal from the mixer 179 is fed into another mixer 189 where it is mixed with a signal of 50 megacycles. The 50 megacycle signal is obtained by passing the 1 megacycle signal from the precision oscillator 111 through the emitter follower 151, the amplifier 153, the emitter follower 155, the multiplier 141, the multiplier 143, the multiplier 145, and a 50 megacycle amplifier 191. The output signal of the mixer 189 is a 54 megacycle $- \Delta f$ signal which is applied to the 64 megacycle mixer 169.

It will be remembered that the receiver (FIG. 7) can operate at a frequency of either 324 megacycles or 400 megacycles. In the case of the frequency synthesizer 69 (FIG. 7), it is convenient to first cover the 324 megacycle case. In this operation, the local oscillator signal required by the first mixer is 264 megacycles. It is to be noted that the signal from the mixer 171 is at 64 megacycles $- \Delta f$, while the signal from the mixer 169 is 64 megacycles + 250 cycles $- \Delta f$. These two signals are fed to two independent mixers 193 and 195, respectively, where they are mixed with 200 megacycle signals derived from the 1 megacycle precision oscillator 111. The 200 megacycle signals are obtained by passing the 1 megacycle signal from the 1 megacycle precision oscillator 111 through the emitter follower 151, the amplifier 153, the emitter follower 155, the multiplier 141, the multiplier 143, the multiplier 145, a 50 megacycle amplifier 197, a multiplier 199 and a 200 megacycle amplifier 201. Thus the output signal from the mixer 195 will be at 264 megacycles + 250 cycles $- \Delta f$, and the output signal from the mixer 193 will be at 264 megacycles $- \Delta f$. The output signal from the mixer 193 is amplified in an amplifier 203, and the output signal from the mixer 195 is amplified in an amplifier 205. The output signal from the amplifier 203 is fed to a mixer such as the mixer 65 (FIG. 7), and the output signal from the amplifier 205 is sent to a mixer such as the mixer 67 (FIG. 7). The $\Delta f$ term, of course, varies as the frequency of the 100 kc voltage controlled oscillator 105 (FIG. 7) is varied, but the two local oscillator signals maintain a constant 250 cycle difference regardless of the value of $\Delta f$.

There are a number of ways to provide the first local oscillator signal which is required when a 400 megacycle signal is being tracked. The method to be described hereinafter provides the minimum difficulty in filtering the various spurious signals. The output from the 64 megacycle mixer 171 is fed to a 40 megacycle mixer 207. The second signal for the 40 megacycle mixer 207 is 24 megacycles, which is obtained by passing the 1 megacycle signal from the precision oscillator 111 through the emitter follower 151, the multiplier 133, the multiplier 135, the multiplier 137, and a 24 megacycle amplifier 209. To provide the offset signal the signal from the 64 megacycle mixer 169 is fed to a 40 megacycle mixer 211. The mixer 211 additionally receives a 24 megacycle signal in a manner analogous to that of the mixer 207. The output signal from the mixer 207 has a frequency of 40 megacycles $- \Delta f$. This signal is fed to a 340 megacycle mixer 213. The 340 megacycle mixer 213 also receives a 300 megacycle signal which is obtained by passing the signal from the 1 megacycle precision oscillator 111 through the emitter follower 151, the 1 megacycle amplifier 153, the emitter follower 155, the multiplier chain 139, and an amplifier 214. The output signal from the mixer 213 is fed to an amplifier 215 which amplifies the signal and feeds it to the mixer 65 (FIG. 7). The offset signal from the mixer 211 is fed to a 340 megacycle mixer 217. The mixer 217 also receives a 300 megacycle signal which is derived from the 1 megacycle precision oscillator 111 in a manner analogous to the 300 megacycle signal which is fed to the mixer 213. The output signal from the mixer 217 is at a frequency of 340 megacycles + 250 cycles − Δf, and this signal is fed to an amplifier 219 where it is amplified and fed to the mixer 61 (FIG. 7). Thus, it can readily be seen that the receiver will be able to track a signal of either 324 megacycles of 400 megacycles. It should be understood that the principles disclosed herein are applicable in designing a system to track signals of any frequency whatsoever.

As previously mentioned, the frequency synthesizer 69 also provides the other local oscillator signals required. The 50 megacycle local oscillator signal for the mixer 75 (FIG. 7) is derived by passing the 1 megacycle signal from the precision oscillator 111 through the emitter follower 151, the 1 megacycle amplifier 153, the emitter follower 155, the multiplier 141, the multiplier 143, the multiplier 145, the 50 megacycle amplifier 191, and a 50 megacycle phase lock loop 221. To obtain the 10.2 megacycle local oscillator signal required for the mixer 79 a somewhat different path is followed. A 100 kc signal from the decade divider 155 (FIG. 7) is fed to the multiplier 175 where it is multiplied up to 300 kc. This 300 kc signal is fed to a multiplier 223 where it is multiplied up to 1.2 megacycles and fed to a 10.2 megacycle mixer 225. The second input to the mixer 225 is a 9 megacycle signal which is obtained by passing the signal from the 1 megacycle precision oscillator 111 through the emitter follower 151, the amplifier 181, the emitter follower 183, the multiplier 185, and a 9 megacycle multiplier 227. The output signal from the mixer 225 has a frequency of 10.2 megacycles and is passed through a 10.2 megacycle phase lock loop 229 to the mixer 79 (FIG. 7). The 10.2 megacycle phase lock loop 229 and the 50 megacycle phase lock loop 221 are necessary to further provide purity of the local oscillator signals, by removing spurious signals. The 100 kc signal from the decade divider 115 (FIG. 7) is also passed through a 200 kc multiplier 231 to provide the 200 kc reference signal (FIG. 7) which is fed to the phase comparator 101, the phase shifting network 127, the phase comparator 89, and the correlation phase comparator 125 (all shown in FIG. 7).

Figure 10:
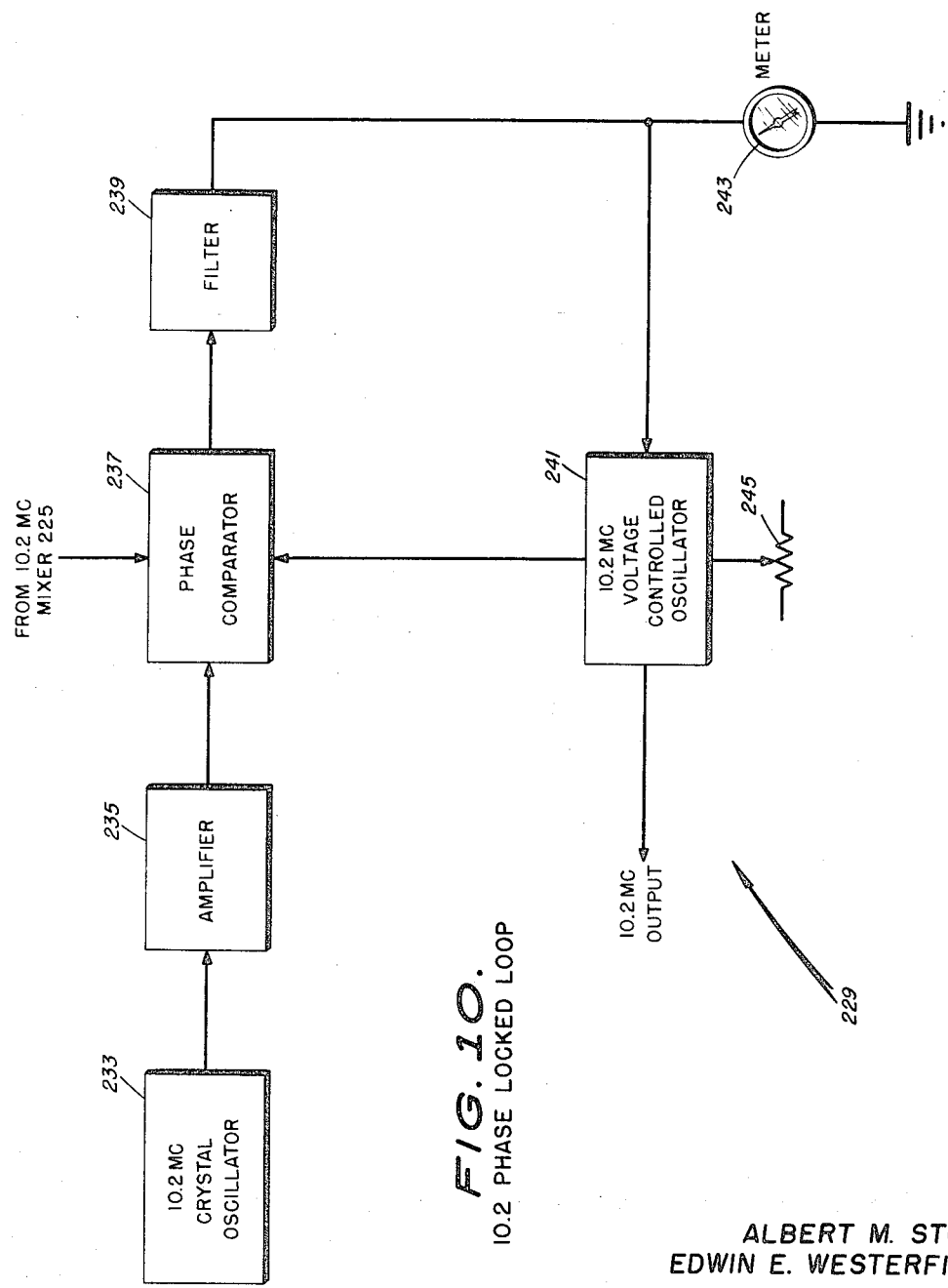
FIG. 10 is a functional block diagram of the 50MC phase lock loop of FIG. 7.

Referring to FIG. 10 the 10.2 megacycle phase lock loop 229 (FIG. 9) is shown in functional block diagram form. The 50 megacycle phase lock loop 221 (of FIG. 9) is of identical construction except for frequency, and therefore only the 10.2 megacycle phase lock loop 229 will be illustrated. A 10.2 megacycle crystal oscillator is shown at 233. This oscillator is very similar to the 10.000250 megacycle crystal oscillator 157 (FIG. 9) which is utilized within the first local oscillator loop, in that a Varicap is utilized to provide a small variation in frequency. The output signal from the 10.2 megacycle crystal oscillator 233 is fed through an amplifier 235 to a phase comparator 237. The phase comparator 237 receives a reference 10.2 megacycle signal from the mixer 225 (FIG. 9) whose phase is compared with the signal from the 10.2 megacycle crystal oscillator 233. In the case of the 50 megacycle phase lock loop, the reference signal to the phase comparator is the 50 megacycle signal emanating from the 50 megacycle amplifier 191 (FIG. 9). The output signal from the phase comparator 237 is fed through a low pass filter 239 to a 10.2 megacycle voltage controlled oscillator 241. In the case of the 50 megacycle phase lock loop, the 10.2 megacycle voltage controlled oscillator 241 is replaced with a 50 megacycle voltage controlled oscillator. The voltage controlled oscillator 241 provides an output signal back to the phase comparator 237 and also provides the 10.2 megacycle output signal to the mixer 79 (FIG. 7). Basically the phase comparator 237 compares the signal from the 10.2 megacycle crystal oscillator 233 with the 10.2 megacycle signal emanating from the mixer 225 (FIG. 9) and an output error signal is fed through the filter 239 to provide a dc signal for the voltage controlled oscillator 241. The frequency of the 10.2 megacycle crystal oscillator 233 is thus varied until it has a frequency of exactly 10.2 megacycles and is locked in phase to the reference 10.2 megacycle signal from the mixer 225 (FIG. 9). A meter 243 and a potentiometer 245 are connected into the circuit following the filter 239 to allow the loop to be manually balanced. The loop is a straight forward first order loop. Since the signal is dynamically stable and the phase of the 10.2 megacycle signal is not particularly important, there is no requirement to utilize a complex loop. If it is desired a second phase comparator can be utilized in which the two input signals have been shifted in phase so that they are exactly in phase. The output of this phase comparator can then be used as a correlation detector to indicate that phase lock has, indeed, been achieved and is being held. It should be emphasized at this point that both the 10.2 megacycle phase locked loop and the 50 megacycle phase locked loop could be replaced with conventional crystal filters to provide the desired signal purification. Factors of costs and convenience dictate whether to utilize the phase locked loops or the crystal filters.

Figure 11:
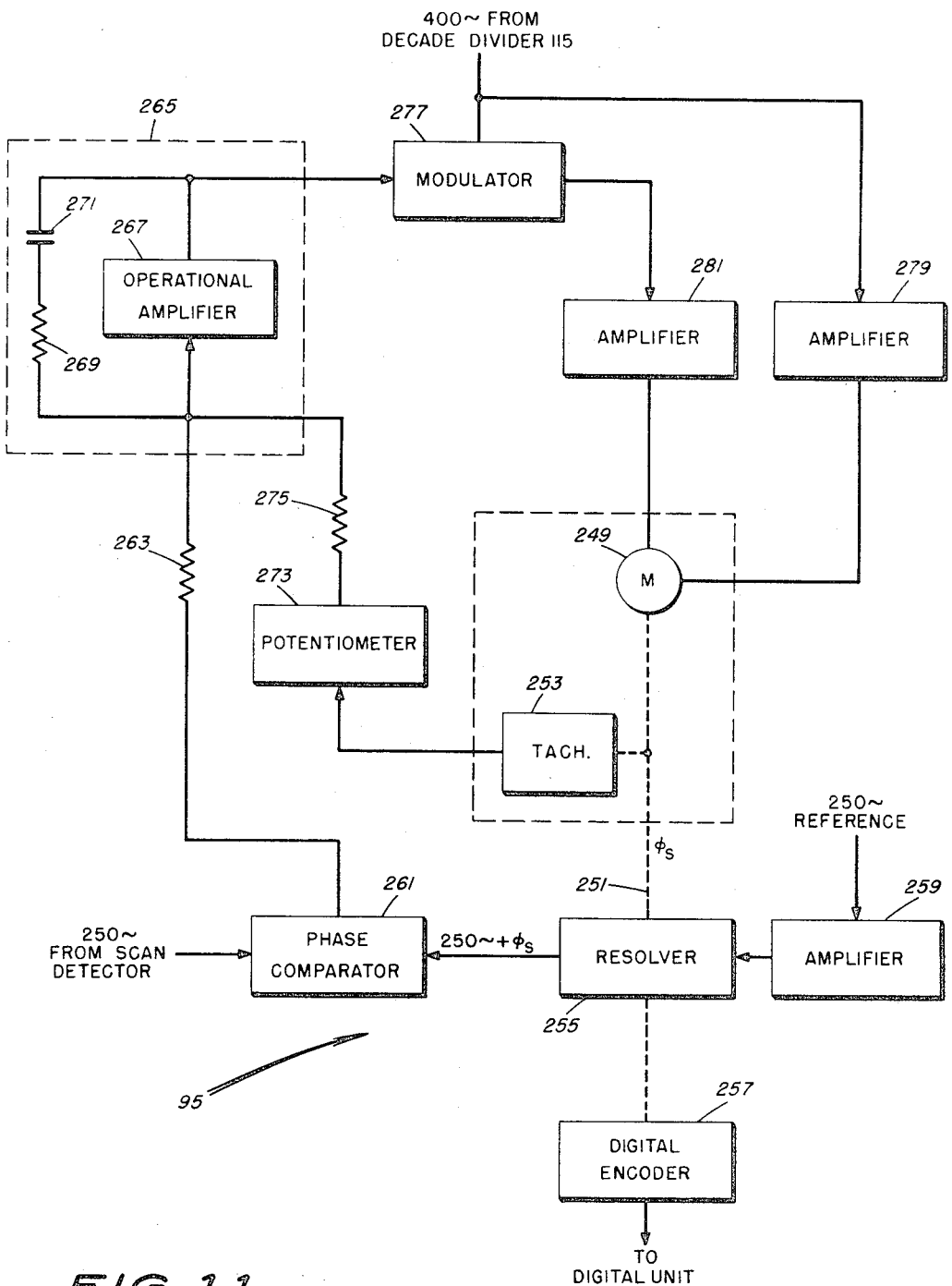
FIG. 11 is a functional block diagram of the phase measuring servo-system of FIG. 7.

Referring to FIG. 11 the phase follow-up servo 95 (FIG. 7) is illustrated in block diagram form. There are numerous systems that could be utilized to measure the phase difference between the two signals. The system selected appears to possess certain advantages over other systems in its ability to provide better filtering and operate with a narrower effective bandwidth. The phase follow-up servo unit 95 basically comprises a mechanical servo follower assembly 247. The mechanical servo follower assembly 247 includes a two phase motor 249 which is geared to drive a shaft 251, and a tachometer generator 253 which is geared to the shaft 251. A resolver 255 is mounted on the shaft 251 and is driven by the two phase motor 249. Also mounted on the shaft 251 is a digital encoder 257. The digital encoder 257 provides a digital output that can read the angle of the shaft 251 to one part in one thousand, and an additional output that effectively counts the turns of the shaft up to 99. This counter is cyclic; that is, when it reaches 99 it then returns to 00. It is to be noted that a number of auxiliary devices can be connected to the shaft 251 by means of a gearing system. A potentiometer can be connected directly to the shaft 251 after the resolver 255 to provide an analog read-out of the shaft position. Additionally, a dial can be connected to the shaft 251 in such a way that the position of the shaft can be read visually. A gear train can be connected to the shaft 251 to drive a second low speed shaft which rotates one rotation for each 100 rotations of the principal shaft 251. Two potentiometers can be connected to this low speed shaft; one of which can be used for initially setting the complete servo system so that at the beginning of a satellite pass, the unit will read 00000, and the other potentiometer can be used to provide an analog read-out of the position of the low speed shaft. The two analog read-out potentiometers can be connected into a galvanometer recorder so that the operation of the system can be readily evaluated in following the path of the satellite. Additionally, a dial can be coupled to the low speed shaft to provide a direct visual read-out.

For the servo reference signal, the same signal is utilized as that used for the generation of the 10.000250 megacycle signal in the frequency synthesizer 69. The servo reference signal is a 250 cycle signal from the frequency synthesizer 69 (FIG. 7) and it is fed through an amplifier 259 to the resolver 255. The resolver 255 shifts the phase of the 250 cycle reference signal depending on the position of the shaft 251. The output signal from the resolver 255 is equal to:

$$\text{Sin}(250\,t+\phi_s)$$

where $\phi_s$ is the angle of the shaft 251 measured from a reference position. This signal is fed into a phase comparator 261. The second signal into the phase comparator 261 is the signal from the scan detector 87 (FIG. 7). The output signal from the phase comparator 261 is equal to:

$$V_{pc}=V_c\text{Cos}(\phi_M-\phi_s) \qquad (AA)$$

where $\phi_M$ is the phase difference of the signal received by the two antennas $A_1$ and $A_2$ (FIG. 7) and $V_c$ is a constant depending upon the amplitude of the two signals; this signal is fed through a resistor 263 into a transfer function network 265 that has a transfer function equal to:

$$H(s) = \frac{K(1+as)}{s} \qquad \text{(BB)}$$

where $K$ and $a$ are constants and $s$ is the Lapalaceian $s$. The transfer function network 265 comprises an operational amplifier 267 shunted by the serially connected resistor 269 and capacitor 271.

The use of this transfer function results in a type two servo system. With this system there is no position or velocity error, but only an error caused by acceleration. With the type of signals that are received from the satellites, this is not a problem, since the accelerations are quite small. In the current operation $K$ has a value of 1.45 with $a$ equal to approximately 2.1. This results in a bandwidth for the system of approximately 0.9 cycles per second. Additional data smoothing is obtained in the servo, however, by the use of tachometer feedback which aids considerably in linearizing the overall servo system and providing additional smoothing. The tachometer feedback is provided by means of the tachometer generator 253 which is geared to the shaft 251 and feeds an electrical signal through the potentiometer 273, and the resistor 275 to the transfer function network 265.

The output signal from the transfer function network 265 is fed to a 400 cycle modulator 277. The modulator 277 receives a 400 cycle signal from the decade divider 115 (FIG. 7). In this particular case, the 400 cycle signal is much more precise than need be. This same 400 cycle signal from the decade divider 115 is fed through an amplifier 279 to the two phase motor 249. The modulator 277 provides input signals to the motor 249 through the amplifier 281. Since the motor 249 in a two phase motor its windings have to be excited 90° apart. The modulator 277 varies the amplitude of the 400 cycle input signal and reverses the phase as required to run the motor 249 in either direction. With the loop closed, the position of the shaft 251 becomes a direct indicator of the phase angle between the signal from the scan detector 87 (FIG. 7) and the 250 cycle reference signal from the frequency synthesizer 69 (FIG. 7). If the shaft 251 is not in the proper position for a given phase relationship, then the two signals (the 250 cycle reference signal and the 250 cycle signal from the scan detector) received by the phase comparator 261 will not be 90° out of phase. This will result in a dc output signal to the transfer network 265 which is shaped by said transfer network 265 so as to produce an output signal from the modulator 277 which drives the motor 249 and rotates the shaft 251. The rotation of the shaft 251 turns the resolver 255 which changes the phase of the reference signal to the phase comparator 261 until these two signals are 90° out of phase. As previously mentioned, the digital encoder 257 is mounted directly on the shaft 251 and thus provides a digital indication of the position of said shaft 251. This information is fed to the digital print-out unit 117 (FIG. 7) where it is converted into teletype format and punched out on punched paper tape.

This phase measuring scheme is capable of measuring phase angles to an accuracy of at least 1°, providing the signal has a sufficient signal to noise ratio. The system performs quite well, however, even when the signal to noise ratio is quite poor, due to the filtering action, both mechanically and electrically, of the device.

To obtain useful information from the complete system, it is essential that a method be available that will allow the information obtained by the receiver (enclosed in dotted lines in FIG. 7) to be readily entered into a digital computer. To fulfill this requirement, the azimuth measuring system is equipped with the digital time unit 113 (FIG. 7) that converts the data obtained from the digital encoder 119, mounted on the phase follow-up servo assembly 95, to a form that can be recorded on punched paper tape. In addition, it is essential that time information also be recorded on the paper tape to allow the data to be properly processed. For convenience, all data is punched into the tape in a standard teletype format. The principal reason for this is that it allows the data to be readily read out through the use of a standard teletypewriter to enable manual calculations to be made when required. In addition, this format allows the data to be transmitted by means of standard teletypewriter circuits from the station to the computer when the two are located some distance apart. Another advantage of utilizing this format is that for the computer to properly process the data, certain information must be punched onto the tape ahead of the data. By utilizing this format, a standard teletypewriter can be utilized for punching this required data.

Figure 12:
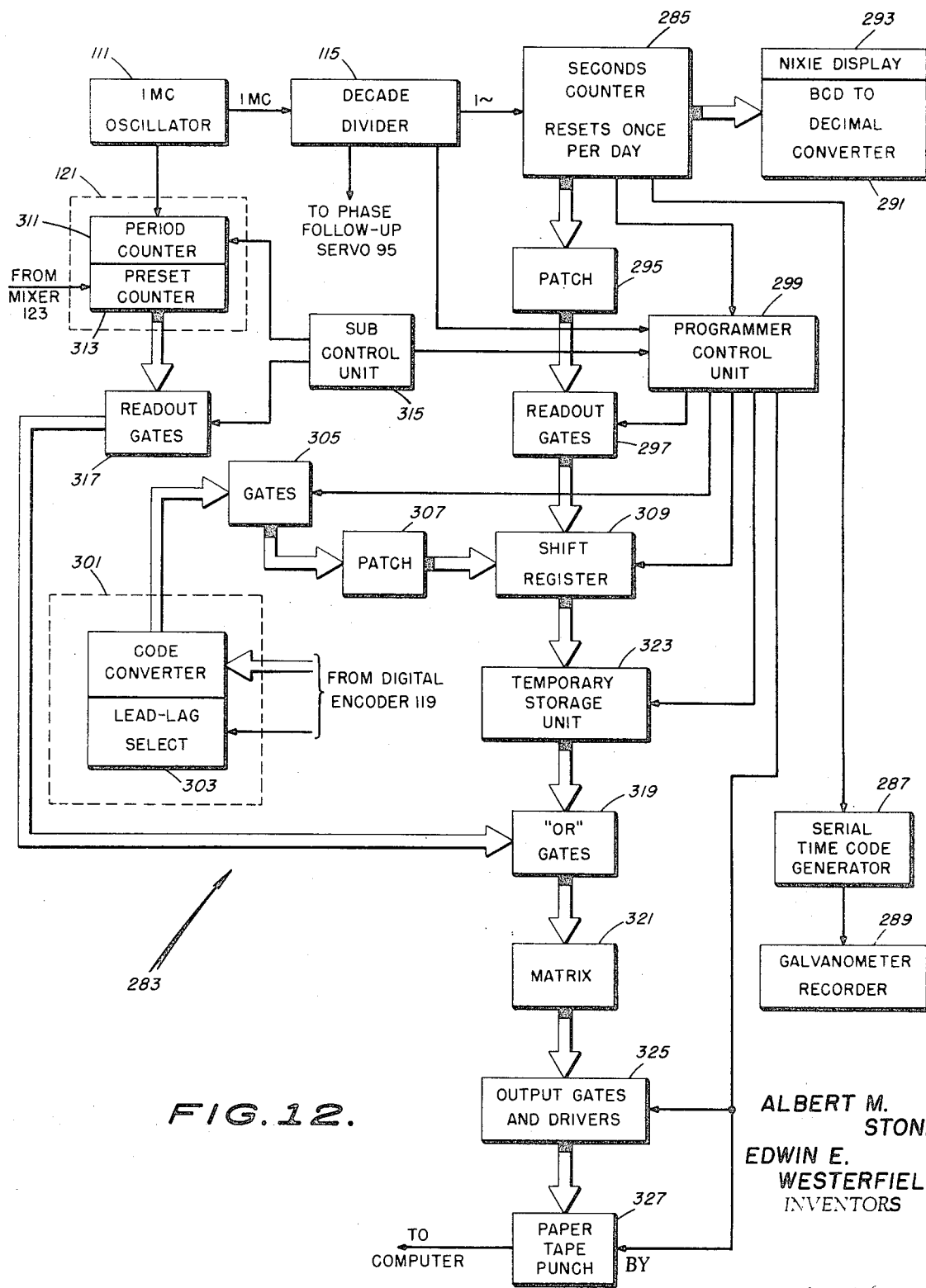
FIG. 12 is a functional block diagram of the digital time unit of FIG. 7.

Referring to FIG. 12, a functional block diagram of the digital time unit 113 is shown generally at 283. A 1 megacycle signal from the 1 megacycle precision oscillator 111 (FIG. 7) is fed into the decade divider 115. The decade divider 115 is the same decade divider shown in FIG. 7 and comprises a string of six decade divider units (not shown). The decade divider 115 provides a 1 cycle per second output signal to a seconds counter 285. The seconds counter 285 comprises a string of five decade divider units (not shown) which divide the output signal from the decade divider 115 down to a frequency of 1 pulse per day. The seconds counter 285 additionally incorporates an end of day reset circuit (not shown) which automatically resets all units to zero (in a well-known manner) when the time reaches 86,400 seconds. The end of day reset circuitry is connected to the last three decade dividers (not shown) in the seconds counter 285. Each divider is provided with a way of presetting it so that it can be made to read directly in Greenwich time. For the low speed units, this is accomplished by providing a system where the dividers can be preset to a given value before the signal is gated into the unit. For the high speed units a well-known means is provided by which the high speed dividers can be manually advanced or retarded to bring the output in synchronization with a pulse from radio station WWV or some other standard.

A serial time code generator 287 is connected to the decade dividers of the seconds counter 285. The purpose of this unit is to provide a serial code that reads out once every 10 seconds and that can be utilized to provide a time code to record, e.g., on paper or on magnetic tape, so that precise time at which any data is taken can be identified. In the particular embodiment of the invention illustrated herein the output signal from the serial time code generator 287 is fed to a galvanometer recorder 289. The seconds counter 285 also controls a binary coded decimal to decimal converter 291 and a NIXIE display 293. The decimal converter 291 functions as a clock and, together with the NIXIE display 293, serves to provide a means for determining the initial setting.

The digital data processor 283 (digital time unit 113 of FIG. 7) functions to convert the phase angle data, time data, and Doppler data into a teletype format and to punch this data out serially on 5 level punched paper tape. The particular embodiment of the digital unit 283 illustrated herein is current practise in the art. Therefore, only a very brief description of the digital unit 283 is presented herein so that its place in the overall system can be readily understood.

Again referring to FIG. 12, the seconds counter 285 is connected through a patch 295 to the read-out gates 297, and is directly connected to the programmer control unit 299. The output Datex coded signal from the digital encoder 119 (FIG. 7) is fed to a code converter 301 which includes a lead-lag selection network 303 which makes a lead-lag selection.

The code converter 301 is connected to the programmer control unit 299 through gates 305, and said gates 305 are connected to a shift register 309 through a patch 307. The shift register 309 is connected to a tape punch 327 through a temporary storage unit 323, "or" gates 319, a matrix 321, and an output gate and driver unit 325. As will be seen, the programmer control unit 299 is also connected to the shift register 309, the storage unit 323, the gate and driver unit 325, and to the tape punch 327.

A 100 kc reference signal is fed to the mixer 123 (FIG. 7), and said mixer is connected to the counter 121 which includes a period counter 311 and a preset counter 313. The counter 121 is controlled by a sub-control unit 315 which is connected between said counter 121 and the programmer control unit 299. Said sub-control unit 315 and the preset counter 313 are connected to readout gates 317 and said gates 317 are connected to the "or" gates 319.

Obviously, many modifications and variations of the present invention are possible in the light of the above teachings. It is therefore to be understood that within the scope of the appended claims the invention may be practiced otherwise than as specifically described.

What is claimed is:

1. In a system for determining azimuth the combination with an orbiting active satellite, including
   a pair of antennas spaced a distance corresponding to a number of wavelengths of a signal from said satellite,
   a pair of pre-amplifiers, each connected to one of said antennas,
   a pair of RF amplifier and mixer assemblies, each connected to one of said pre-amplifiers,
   a linear mixer connected to at least one of said pair of RF amplifier and mixer assemblies,
   a first IF strip connected to the output of said linear mixer,
   a fourth mixer connected to the output of said first IF strip,
   a second IF strip connected to the output of said fourth mixer,
   a fifth mixer connected to the output of said second IF strip,
   a third IF strip connected to the output of said fifth mixer,
   a fourth IF strip connected to the output of said third IF strip,
   a detector connected to the output of said fourth IF strip,
   a sweep stop circuit connected to the output of said detector,
   a discriminator connected to the output of said fourth IF strip,
   a scan detector connected to the output of said third IF strip,
   a phase follow-up servo connected to the output of said scan detector,
   a digital encoder connected to the output of said phase follow-up servo,
   a digital print-out unit connected to the output of said digital encoder,
   an AGC detector connected to the output of said third IF strip and to said first IF strip for keeping the output signal of said first IF strip at an essentially constant level,
   a first phase comparator connected to the output of said third IF strip,
   an audio amplifier connected to the output of said first phase comparator,
   a speaker connected to the output of said audio amplifier,
   a correlation phase comparator connected to the output of said fourth IF strip,
   a phase shift network connected to the input of said correlation phase comparator,
   a relay switch operatively connected to the output of said correlation phase comparator and to the input of said linear mixer, whereby one of said pair of RF amplifier and mixer assemblies can be automatically connected to said linear mixer in response to signals from said correlation phase comparator,
   a second phase comparator connected to the output of said fourth IF strip,
   a delay switch operatively connected to said second phase comparator,
   a transfer function network connected to the output of said delay switch,
   a voltage controlled oscillator connected to the output of said transfer function network,
   a sixth mixer connected to the output of said voltage controlled oscillator,
   a counter connected to the output of said sixth mixer,
   a precision oscillator,
   a decade divider operatively connected to said precision oscillator, said phase follow-up servo, and said digital print-out unit, and
   a frequency synthesizer operatively connected at its input to said precision oscillator, said decade divider, and said voltage controlled oscillator, and connected at its output to each of said pair of RF amplifier and mixer assemblies, said fourth mixer, said phase shift network, said fifth mixer, said first phase comparator, said second phase comparator, said sixth mixer, and said phase follow-up servo.

2. The invention recited in claim 1, additionally including means for sweeping the azimuth determining system over a frequency region surrounding the expected location of a signal from said satellite, and
   sweep stop means for stopping said sweeping, when the azimuth determining system is swept past the frequency of a signal being received from said satellite, and replacing the signal from said sweeping means with the signal from said discriminator.

3. The invention as recited in claim 2, wherein said sweep stop means is connected to said detector and controlled by signals therefrom, and said sweeping means is connected to said transfer function network.

4. The invention as recited in claim 1, additionally including means for locking onto the phase of a signal received from said satellite.

5. In a system for determining azimuth, the combination with an orbiting active satellite, including
   a first antenna for receiving signals from said satellite,
   a second antenna remote from said first antenna for receiving signals from said satellite,
   a first pre-amplifier connected to said first antenna,
   a second pre-amplifier connected to said second antenna,
   a first mixer connected to said first pre-amplifier,
   a second mixer connected to said second pre-amplifier,
   a linear mixer connected to both said first and second mentioned mixers,
   a plurality of IF strips connected to said linear mixer,
   a detector connected to the output of said plurality of IF strips,
   a reference oscillator for generating reference signals,
   a phase comparator connected to said reference oscillator and to the output of said plurality of IF strips,
   a transfer function network connected to the output of said phase comparator,
   means for generating local oscillator signals to said first and second mentioned mixers,
   a continuous phase shifter connected to said local oscillator generating means and to said first mentioned mixer for providing a frequency difference between the signals received by said first and second mixers, and
   phase measuring means connected to said detector and said continuous phase shifter for measuring the phase difference between the signals received at said first and second antennas whereby the angle difference between the first and second antennas and the radial line of sight to the satellite may be determined.

6. The invention as set forth in claim 5 wherein said local oscillator generating means is connected to said transfer function network and is responsive to output signals therefrom.

7. The invention as set forth in claim 6, additionally including
   means for sweeping the azimuth determining system over a frequency region surrounding the expected location of a signal from said satellite, and
   sweep stop means for stopping said sweeping, when the azimuth determining system is swept past the frequency of a signal being received from said satellite, and replacing the signal from said sweeping means with the signal from said plurality of IF strips.

8. The invention as recited in claim 7 wherein said sweeping means is connected to said transfer function network and supplies signals thereto.

9. The invention as set forth in claim 5, additionally including means for locking onto the phase of a signal received from said satellite.

10. In a system for determining azimuth, the combination with at least one signal generating orbiting satellite whose position is known in inertial space, and a receiving station whose location on the surface of the earth is known, including
 a first antenna located at said receiving station for receiving signals from said satellite,
 a second antenna positioned at said receiving station remote from said first antenna for receiving signals from said satellite,
 receiving means for receiving, amplifying, and detecting signals from said first and second antennas,
 means for sweeping said receiving means over a frequency region surrounding the expected location of a signal from said satellite,
 sweep stop means for stopping said sweeping, when the receiver is swept past the frequency of a signal being received from said satellite,
 means for locking said receiving means onto the phase of a signal received from said satellite by one of said antennas,
 means for directly measuring the phase difference between the signals received by said first and second antennas and converting this phase difference into a mechanical shaft angle,
 means for converting said mechanical shaft angle into a coded digital output signal,
 means for converting said coded digital output signal into a teletype format, and
 means for punching said teletype format onto paper tape,
 said paper tape containing phase information, together with the known location of said satellite in inertial space and the known position of said receiving station.

11. The combination, with at least one signal generating orbiting satellite whose position is known in inertial space and a receiving station whose location on the surface of the earth is known, including
 a first antenna located at said receiving station for receiving signals from said satellite,
 a second antenna positioned at said receiving station remote from said first antenna for receiving signals from said satellite,
 receiving means for receiving, amplifying, and detecting signals from said first and second antennas,
 a detector connected to the output of said receiving means,
 a reference oscillator for generating reference signals,
 a phase comparator connected to said reference oscillator and to the output of said receiving means,
 a transfer function network connected to the output of said phase comparator,
 means for generating local oscillator signals for said receiving means,
 a continuous phase shifter connected to said local oscillator generating means and to said receiving means for providing a frequency difference between the signals received by said first and second antennas,
 phase measuring means connected to said receiving means and to said continuous phase shifter for measuring the phase difference between the signals received by said first and second antennas, and converting this phase difference into a mechanical shaft angle,
 means for converting said mechanical shaft angle into a coded digital output signal,
 means for converting said coded digital output signal into a teletype format, and
 means for punching said teletype format onto paper tape,
 said paper tape containing phase information, together with the known location of said satellite in inertial space and the known position of said receiving station.

12. The invention as set forth in claim 10, wherein said first and second antennas are positioned at said receiving station a distance apart equal to a number of wavelengths of the signal from said satellite.

13. The invention as recited in claim 11, wherein said first and second antennas are positioned at said receiving station a distance apart equal to a number of wavelengths of the signal from said satellite.

14. The invention as recited in claim 11, additionally including,
 means for sweeping said receiving means over a frequency region surrounding the expected location of a signal from said satellite,
 sweep stop means for stopping said sweeping, when the receiver is swept past the frequency of a signal being received from said satellite, and
 means for locking said receiving means onto the phase of a signal received from said satellite by one of said antennas.

15. The invention as set forth in claim 14, wherein said first and second antennas are positioned at said receiving station a distance apart substantially equal to the number of wavelengths of the signal from said satellite.

16. In an azimuth determining system, the combination with at least one signal generating orbiting satellite whose position is known in inertial space, and a receiving station whose location on the surface of the earth is known, including
 a first antenna located at said receiving station for receiving signals from said satellite,
 a second antenna positioned at said receiving station remote from said first antenna for receiving signals from said satellite, receiving means for receiving, amplifying, and detecting signals from said first and second antennas,
 frequency synthesizing means connected to said receiving means for providing a frequency difference between the signals received by said receiving means from said first and second antennas,
 means for sweeping said receiving means over a frequency region surrounding the expected location of a signal from said satellite,
 sweep stop means for stopping said sweeping when the receiving means is swept past the frequency of a signal being received from said satellite,
 means for locking said receiving means onto the phase of a signal received from said satellite by one of said antennas,
 means for directly measuring the phase difference between the signals received by said first and second antennas and converting this phase difference into a mechanical shaft angle,
 means for converting said mechanical shaft angle into a coded digital output signal,
 means for converting said coded digital output signal into a teletype format, and
 means for punching said teletype format onto paper tape,
 said paper tape containing phase information, together with the known location of said satellite in inertial space and the known position of said receiving station, whereby the angle difference between the first and second antennas and the radial line of sight to the satellite may be determined.

17. The invention as set forth in claim 16, wherein said first and second antennas are positioned at said receiving station a distance apart equal to a number of wavelengths of the signal from said satellite.

18. In an azimuth determining system for use in combination with an orbiting satellite having a known location in inertial space wherein a continuous wave signal is transmitted from said satellite, an azimuth receiver having a known location on the surface of the earth, including
 first means for receiving the signals from said satellite,
 second means for receiving the signals from said satellite,
 means for generating a plurality of signals at diverse frequencies,
 means for providing a frequency difference between the signals received by said first and second receiving means,
 means for summing said received signals,
 means for amplifying and detecting said received signals,
 means for obtaining the scan signal between said received signals,
 means for comparing the phase difference between the scan signal and one of the signals generated by said signal generating means of the same frequency, means for converting the phase difference between the signals received by said first and second receiving means into a mechanical shaft angle, means for converting said mechanical shaft angle into a coded digital output signal, means for converting said coded digital output signal into a teletype format, and means for punching said teletype format onto paper tape, computer means for processing said phase information from said paper tape, together with the known location of said satellite in inertial space and the known position of said azimuth receiver.

19. In combination with at least one orbiting signal generating satellite having a known location in inertial space and a receiving station having a known location on the surface of the earth, a method for determining the azimuth of a line passing through two remote antennas on said receiving station, comprising the steps of receiving said signals at each of two remote locations, providing a frequency difference between said signals received at said remote locations, summing said received signals, detecting said summed signals, measuring the phase difference between said received signals, producing a coded digital output signal from said phase difference measurements, converting the digital output signal into a teletype format, placing the teletype format on tape, and processing the information contained on the tape.

20. In combination with an orbiting signal generating satellite having a known location in inertial space and a receiving station having a known location on the surface of the earth, a method for determining the azimuth of a line passing through two remote antennas on said receiving station, comprising the steps of receiving signals from said satellite at each of two remote locations, measuring the phase difference between said received signals, producing a coded digital output signal from said phase difference measurements, converting the digital output signal into a teletype format, placing the teletype format on tape, and processing the information contained on the tape by the use of a digital computer.

* * * * *